United States Patent [19]

Imai et al.

[11] Patent Number: 5,128,868
[45] Date of Patent: Jul. 7, 1992

[54] APPARATUS FOR CONTROLLING GEARSHIFTS IN AUTOMATIC TRANSMISSION

[75] Inventors: Toshitaka Imai; Takamichi Shimada; Takashi Aoki; Junichi Miyake; Satoshi Terayama; Yoshihisa Iwaki, all of Saitama, Japan

[73] Assignee: Honda Giken Kogyo Kabushiki Kaisha, Tokyo, Japan

[21] Appl. No.: 389,851

[22] Filed: Aug. 4, 1989

[30] Foreign Application Priority Data

| Aug. 5, 1988 [JP] | Japan | 63-195409 |
| Aug. 6, 1988 [JP] | Japan | 63-196657 |
| Aug. 9, 1988 [JP] | Japan | 63-198151 |
| Aug. 9, 1988 [JP] | Japan | 63-198152 |

[51] Int. Cl.⁵ .................................. B60K 41/08
[52] U.S. Cl. ................................... 364/424.1; 74/866; 74/867
[58] Field of Search ............. 364/424.1; 74/866, 867

[56] References Cited

U.S. PATENT DOCUMENTS

| 4,653,350 | 3/1987 | Downs et al. | 364/424.1 |
| 4,680,988 | 7/1987 | Mori | 364/424.1 |
| 4,707,789 | 11/1987 | Downs et al. | 74/866 |
| 4,732,253 | 3/1988 | Hiramatsu et al. | 192/87.11 |
| 4,781,080 | 11/1988 | Iwatsuki | 74/867 |
| 4,785,689 | 11/1988 | Iwatsuki et al. | 74/866 |
| 4,798,105 | 1/1989 | Takase et al. | 74/868 |
| 4,870,581 | 9/1989 | Ito et al. | 364/424.1 |

FOREIGN PATENT DOCUMENTS

| 60-151444 | 4/1985 | Japan . |
| 60-201152 | 6/1985 | Japan . |
| 60-245863 | 9/1985 | Japan . |

Primary Examiner—Parshotam S. Lall
Assistant Examiner—V. Trans
Attorney, Agent, or Firm—Lyon & Lyon

[57] ABSTRACT

A clutch engaging torque which will be required by a hydraulically operated clutch to be engaged for a gearshift is preset. A hydraulic pressure required to obtain the clutch engaging torque while the hydraulically operated clutch is at rest is calculated. Then, a corrective action is effected by, for example, subtracting from the hydraulic pressure a centrifugal hydraulic pressure which will be developed in the hydraulically operated clutch by the rotation thereof in the gearshift, thus determining a hydraulic pressure to operate the hydraulically operated clutch.

15 Claims, 21 Drawing Sheets

| So<br>V | 1 | 2 | 3 | 4 |
|---|---|---|---|---|
| <$V_1$ | | | | |
| <$V_2$ | | | | |
| <$V_3$ | | | | |
| <$V_4$ | | | | |
| ≧$V_4$ | | | | |

APPARATUS FOR CONTROLLING GEARSHIFTS IN AUTOMATIC TRANSMISSION

BACKGROUND OF THE INVENTION

The present invention relates to a vehicular automatic transmission for automatically shifting gears by changing power transmission paths through engagement and disengagement of gear shift means (e.g., hydraulically operated clutches).

Automatic transmissions are arranged to shift gears automatically depending on running conditions of a motor vehicle to achieve desired vehicle running characteristics. It is customary to provide a gearshift map composed of upshifting and downshifting curves for each gear position, the curves being established in relation to the vehicle speed and the engine power output, and to control the automatic transmission to shift the gears according to the gearshift map dependent on the running conditions as indicated on the gearshift map. One example of such gear shifting control is disclosed in Japanese Laid-Open Patent Publication No. 61-189354, for example.

One type of automatic transmission includes a power transmission means comprising a plurality of power transmission paths (e.g., a plurality of gear trains), a plurality of gearshift means (e.g., a plurality of hydraulically operated clutches) for selecting the power transmission paths, and a control means (e.g., a hydraulic pressure control valve) for controlling operation of the gearshift means. When a running condition of a motor vehicle, as indicated on a gearshift map, moves across an upshifting or downshifting curve, a gearshift command is produced to effect an upshift or downshift, and a solenoid valve is operated based on the gearshift command to control operation of the hydraulic pressure control valve to engage one of the hydraulically operated clutches. The power transmission path through a certain gear train associated with the engaged clutch is now selected to effect a gearshift.

The speed reduction ratio (gear ratio) of a previous gear position (i.e., a gear position provided by the power transmission path (gear train) selected until a gearshift command is issued) is different from the speed reduction ratio of a next gear position (i.e., a gear position provided by the power transmission path selected by the gearshift command). Therefore, when such a gearshift is effected, it is necessary that the automatic transmission be controlled so as not to produce a gearshift shock and a gearshift delay.

To meet the above requirement, a clutch engaging torque which will provide desired gearshift characteristics free of gearshift shocks and delays is calculated based on an engine torque to be transmitted from the engine to the hydraulically operated clutch for the next gear position, and the hydraulic pressure to be supplied to the clutch is controlled in order to produce the calculated clutch engaging torque.

It is also proposed to connect an accumulator to the hydraulically operated clutch to allow the engaging clutch torque for the next gear position to vary gradually for smooth engagement of the next-gear-position clutch, or to release the hydraulic pressure from the previous-gear-position clutch depending on a hydraulic pressure buildup in the next-gear-position clutch (see Japanese Laid-Open Patent Publication No. 60-211152, for example).

The hydraulic pressure which produces the calculated clutch engaging torque required for a gearshift has been calculated from the pushing force of the piston of the hydraulically operated clutch which will be developed by the hydraulic pressure, and the coefficient of friction of the friction plates of the hydraulically operated clutch. The hydraulically operated clutch is often mounted on the rotatable shaft of the automatic transmission. Since the hydraulically operated clutch mounted on the transmission shaft is rotated itself, it develops centrifugal forces in the oil in the hydraulic pressure chamber of the clutch because of the centrifugal forces to which the clutch is subjected. Thus, even if a constant hydraulic pressure is supplied to the hydraulically operated clutch, the hydraulic pressure in the hydraulic pressure chamber of the clutch becomes higher in a gearshift while the vehicle is running at a higher speed than in a gearshift while the vehicle is running at a lower speed, resulting in a gearshift shock during the gearshift at the higher speed.

According to one known method of suppressing gearshift shocks, the rate of change of the engine rotational speed in a gearshift is compared with a target rate of change, and the hydraulic pressure to be supplied to the hydraulically operated clutch is controlled by a feedback control loop so that the actual rate of change in the engine rotational speed will reach the target rate of change. Such method is disclosed in Japanese Laid-Open Patent Publications Nos. 60-179555, 60-151444, 60-201152, and 60-245863, for example.

Each of the gearshift means is often in the form of a friction clutch. The coefficient of friction of a friction clutch varies depending on the slip rate between the friction surfaces thereof (i.e., the relative speed between the input and output members of the clutch). Accordingly, even if the hydraulic pressure supplied to the hydraulically operated friction clutch is accurately controlled, since the coefficient of friction of the friction clutch varies, the clutch engaging forces vary, making it difficult to provide desired clutch engaging characteristics. The friction characteristics of the clutch differ depending on the material of the friction surfaces and the lubricating oil of the clutch.

FIG. 13 of the accompanying drawings illustrates one characteristic curve of the coefficient of friction by way of example. The graph of FIG. 13 shows the results of a test which was conducted using the SAE No. 2 friction testing machine. Generally, the dynamic coefficient $\mu k$ of friction does not vary largely as long as the slip rate is large, but has a large value immediately before the clutch is directly engaged (i.e., in the vicinity of a time $t_2$). Therefore, as indicated by the solid-line curve, the value of torque T for frictionally engaging the clutch becomes a sharply increasing value immediately before the time $t_2$. The coefficient of friction immediately before the clutch is directly engaged is called a final dynamic coefficient $\mu_o$ of friction. When gearshifts are controlled using the friction clutches having characteristics as indicated by the solid-line curve of FIG. 13, even if a constant hydraulic pressure is supplied to the clutches, the clutch engaging torque rises sharply immediately before the clutch is fully engaged, and hence a gearshift shock is liable to occur.

To solve the above problem, there have been proposed such lubricating oil and friction material that the final dynamic coefficient $\mu o$ is smaller than the dynamic coefficient $\mu k$ of friction. With such an arrangement, however, since the static coefficient $\mu s$ of friction is small, more clutch discs have to be added, the hydraulic pressure has to be changed, and the coefficient of friction tends to vary greatly with time. For these reasons, this proposal has not yet been put to practical use.

Gearshift shocks are made smaller as the time required to effect gearshifts is longer. The gearshift time should however be selected to of an appropriate value because if the gearshift time were too long, the durability of frictional elements of the gearshift means would be adversely affected, and the driver of the vehicle would feel uneasy about the operation of the transmission. The gearshift time is equal to the time in which the input and output members of the gearshift means slip with respect to each other. The gearshift time can be of a suitable value by setting the rate of change of the ratio of the rotational speed of the input member to the rotational speed of the output member to an appropriate value.

According to the transmission control based on the rate of change of the engine rotational speed as disclosed in the above publications, a torque converter is disposed between the engine and the automatic transmission. The transmission cannot suitably be controlled because of the slippage of the torque converter. When the rotational speed and torque change greatly during gearshifts, the slippage of the torque converter varies greatly, and appropriate transmission control cannot be achieved based on the engine rotational speed.

There are known as different control modes for automatic transmissions, including a power-on/upshift mode in which the accelerator pedal is depressed and the transmission is shifted up, and a power-off/downshift mode in which the accelerator pedal is released during running of the vehicle and the transmission is shifted down as the vehicle speed is lowered. In these control modes, when the previous-gear-position gearshift means is disengaged, the difference between the rotational speeds of the input and output members of the next-gear-position gearshift means would be increased (i.e., the rotational speeds of the input and output members vary away from a synchronized speed) if the next-gear-position gearshift means remained disengaged. It is therefore necessary that the next-gear-position gearshift means start to be engaged at a proper timing.

With a hydraulically operated clutches employed as each of the gearshift means, there is a certain time lag before the gearshift means starts being operated after a gearshift command is issued. Such time lags vary depending on the different characteristics of the hydraulically operated clutches and hydraulic pressure control valves and also on the oil temperature. Thus, the timing with which the next-gear-position gearshift means start operating varies from gearshift means to gearshift means.

If the time lag becomes longer, then the engine rotational speed tends to be too high during the power-on/upshift mode, resulting in engine racing, and the engine rotational speed temporarily drops sharply during the power-off/downshift mode or the action of engine braking is reduced. The driver of the vehicle therefore feels embarrassed with respect to gearshifts. More specifically, engine racing in the power-on/upshift mode is apt to produce a gearshift shock. In the power-off/downshift mode, the driver normally expects engine braking to occur, with the result that the driver feels embarrassed by the reduction in the engine rotational speed and the reduced engine braking action. Where the vehicle is equipped with a tachometer, the engine speed indicated by the tachometer is also lowered, making the driver feel also uneasy visually with respect to the indicated engine speed.

The time lag can be shortened by increasing the hydraulic pressure to be supplied to the next-gear-position gearshift means when a gearshift command is issued. If the hydraulic pressure were too high, the next-gear-position gearshift means would be engaged too abruptly, producing a gearshift shock.

SUMMARY OF THE INVENTION

It is an object of the present invention to provide a transmission gearshift control apparatus capable of setting suitable forces for engaging gearshift means so that desired gearshift characteristics will be given to an automatic transmission.

Another object of the present invention is to provide a transmission gearshift control apparatus for setting hydraulic pressures for hydraulically operated clutches serving as gearshift means so that an automatic transmission can be controlled constantly irrespective of different rotational speeds of the hydraulically operated clutches, i.e., different vehicle speeds and engine speeds.

Still another object of the present invention is to provide a transmission gearshift control apparatus for controlling an automatic transmission to reduce variations in the torque applied to engage friction clutches serving as gearshift means when gearshifts are effected, particularly immediately before the clutches are engaged.

Yet another object of the present invention is to provide a transmission gearshift control apparatus for controlling an automatic transmission without being affected by the slippage of a torque converter and hence gearshift shocks.

A further object of the present invention is to provide a transmission gearshift control apparatus which sets a time lag before a gearshift means starts operating in a power-on/upshift mode and a power-off/downshift mode to an appropriate value for effecting good transmission control.

To achieve the above objects, according to the present invention, a clutch engaging torque which will be required by a hydraulically operated clutch to be engaged for a gearshift is preset, a hydraulic pressure required to obtain the clutch engaging torque while the hydraulically operated clutch is at rest is calculated, and a corrective action is effected by, for example, subtracting from the hydraulic pressure a centrifugal hydraulic pressure which will be developed in the hydraulically operated clutch by the rotation thereof in the gearshift, thus determining a hydraulic pressure to operate the hydraulically operated clutch.

Further scope of applicability of the present invention will become apparent from the detailed description given hereinafter. However, it should be understood that the detailed description and specific examples, while indicating a preferred embodiment of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
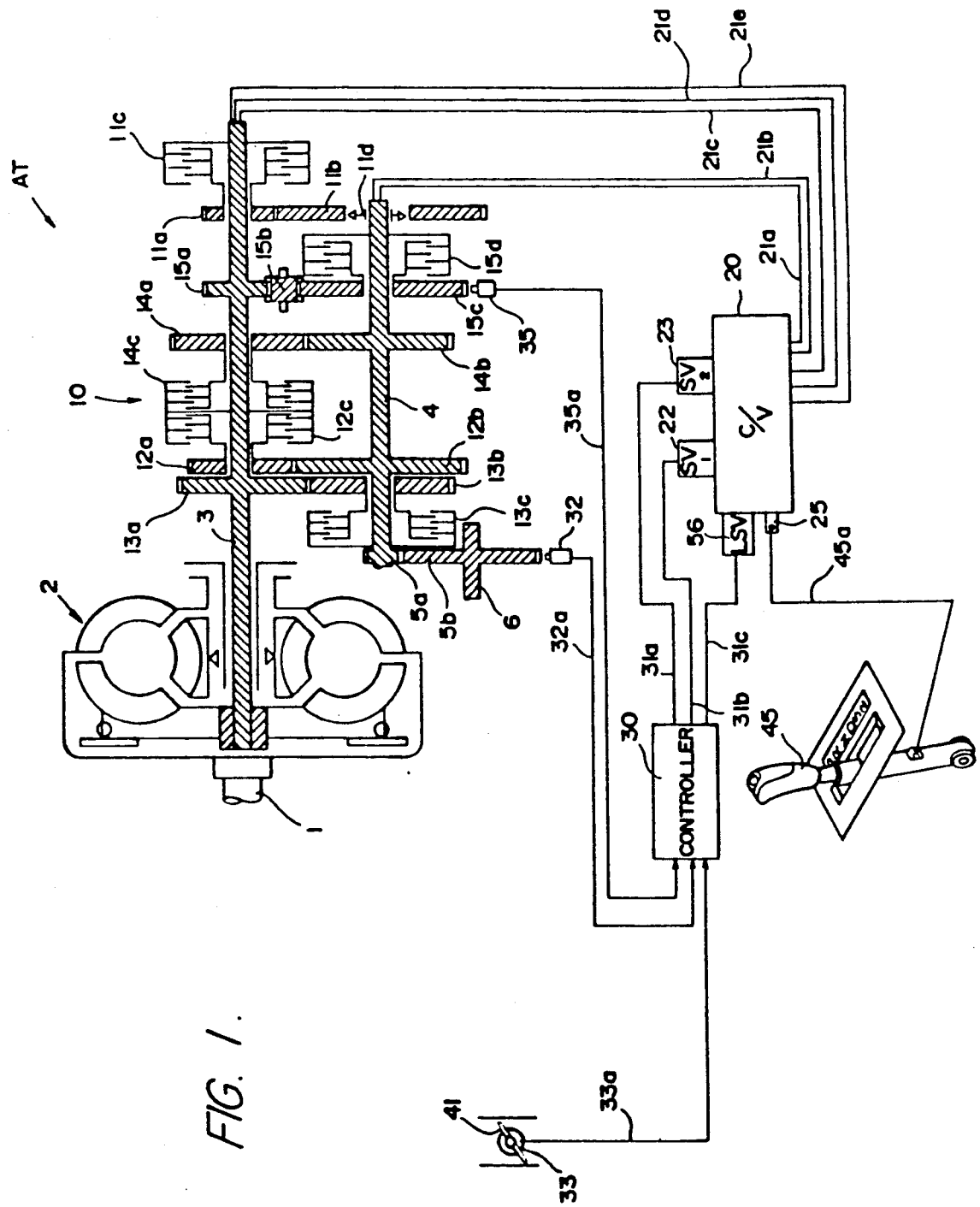
FIG. 1 is a schematic view of an automatic transmission controlled by a gearshift control apparatus according to the present invention the automatic transmission having hydraulically operated clutches operable by hydraulic pressures determined by the gearshift control apparatus.

FIG. 1 schematically shows an automatic transmission which is mounted on a motor vehicle and controlled by a transmission gearshift control apparatus, the automatic transmission having hydraulically operated clutches operable by hydraulic pressures determined by the transmission gearshift control apparatus. The automatic transmission, generally denoted at AT, has a transmission mechanism 10 comprising a plurality of gear trains for changing the speed of rotation of the engine power output transmitted from a torque converter 2 and for applying the engine power output to an output shaft 6. More specifically, the engine power output from the torque converter 2 is applied to an input shaft 3, and then transmitted, while its rotational speed is being changed, to a countershaft 4 extending parallel to the input shaft 3 through a selected one of five gear trains disposed parallel between the input shaft 3 and the countershaft 4. The engine power output is then applied from the countershaft 4 to the output shaft 6 through output gears 5a, 5b disposed between the countershaft 4 and the output shaft 6.

The five gear trains between the input shaft and the countershaft 4 include a gear train composed of gears 11a, 11b for a first gear position, a gear train composed of gears 12a, 12b for a second gear position, a gear train composed of gears 13a, 13b for a third gear position, a gear train composed of gears 14a, 14b for a fourth gear position, and a gear train composed of gears 15a, 15b, 15c for a reverse gear position. These gear trains are associated respectively with hydraulically operated clutches 11c, 12c, 13c, 14c, 15d for enabling the gear trains to transmit the engine power output from the input shaft 3 to the countershaft 4. A one-way clutch 11d is disposed in the gear 11b. By selectively operating the hydraulically operated clutches, one of the five gear trains is selected for engine power transmission while changing the rotational speed of the transmitted engine power output.

The five hydraulically operated clutches 11c through 15d are controlled in operation by a hydraulic pressure supplied and discharged through hydraulic pressure lines 21a through 21e from and to a hydraulic pressure control valve assembly 20.

The hydraulic pressure control valve assembly 20 is operated by a manual spool valve 25 coupled by a wire 45a to a shift lever 45 movable by the driver, two solenoid valves 22, 23, and a linear solenoid valve 56.

The solenoid valves 22, 23 are selectively actuated and inactivated by operating signals supplied from a controller 30 through signal lines 31a, 31b. The linear solenoid valve 56 is operated by a signal supplied from the controller 30 via a signal line 31c. The controller 30 is supplied with a rotational speed signal fed via a signal line 35a from a first rotational speed sensor 35 which detects the rotational speed of an input member of the hydraulically operated clutch 15d based on rotation of the reverse gear 15c, a rotational speed signal fed via a signal line 32a from a second rotational speed sensor 32 which detects the rotational speed of an output member of the hydraulically operated clutch 13c based on rotation of the output gear 5b, and a throttle valve opening signal fed via a signal line 33a from a throttle valve opening sensor 33 which detects the opening of an engine throttle valve 41.

Operation to control gear shifting in the automatic transmission of the above construction will be described below.

Gear shifting control is performed dependent on a shift range selected by the manual valve 25 of the hydraulic pressure control valve assembly 20 in response to manual operation of the shift lever 45. Available shift ranges include shift ranges or positions P, R, N, D, S, 2, for example. In the ranges P and N, all the clutches 11c through 15d are disengaged and the transmission is in a neutral position. In the range R, the reverse-gear-position clutch 15d is engaged to select the reverse gear position. In the ranges D, S, and 2, gear positions are selected based on a gearshift map.

Figure 2:
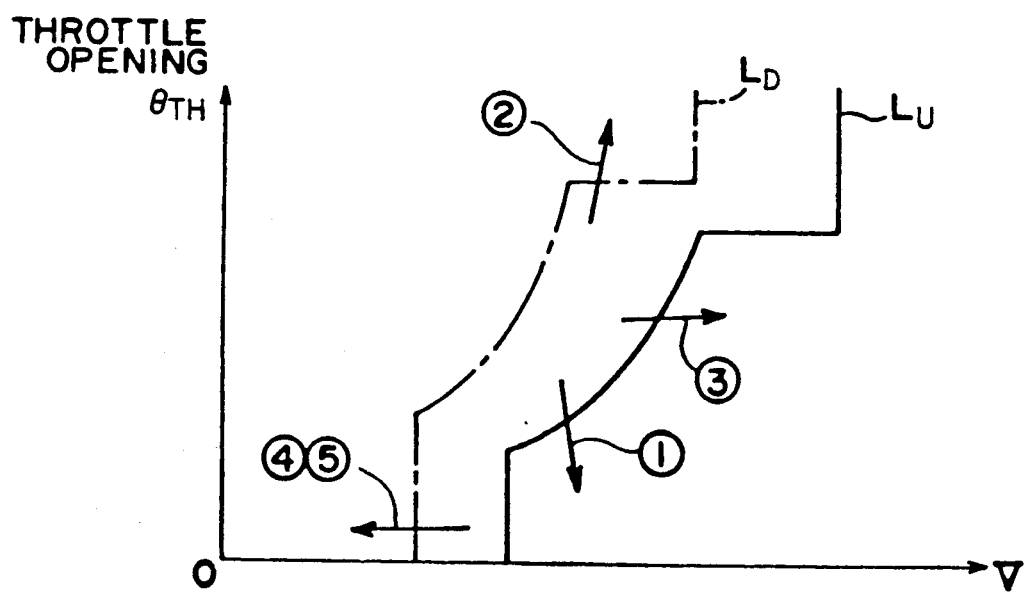
FIG. 2 is a graph illustrating a gearshift map used for gearshift control in the automatic transmission.

As shown in FIG. 2, the gearshift map is composed of an upshifting curve $L_U$ and a downshifting curve $L_D$, these curves being plotted in a graph having a vertical axis indicating the throttle valve opening $\theta_{TH}$ and a horizontal axis indicating the vehicle speed V. When a point on the gearshift map which represents the running condition of the motor vehicle as determined by the engine throttle valve opening and the vehicle speed moves to the right across the upshifting curve $L_U$, the transmission effects a gear upshift. When the point moves to the left across the downshifting curve $L_D$ after the upshift, the transmission effects a gear downshift.

The gearshifts thus effected by the gearshift control apparatus are grouped into the following five modes, which are represented by the corresponding numerals in FIG. 2:

(1) SYU mode: This is a mode in which an upshift is effected when the power is off (e.g., the gears are shifted up when the accelerator pedal is released while the vehicle is running);

(2) SYD mode: This is a mode in which a downshift is effected when the power is on e.g., a kickdown);

(3) IPU mode: This is a mode in which an upshift is effected when the power is on (e.g., the gears are shifted up during acceleration);

(4) IPD mode: This is a mode in which a downshift is effected by operating the manual shift lever 45 while the power is off (e.g., the gears are shifted down by moving the shift lever from the range D into the range S); and (5) EPD mode: This is a mode in which the vehicle speed is lowered to shift down the gears when the power is off (e.g., the accelerator pedal is released while the vehicle is running, and the gears are automatically shifted down with the vehicle coasting and the vehicle speed lowered).

The IPD and EPD modes are the same as long as the accelerated condition and the gearshift type are concerned. However, the driver operates the shift lever to effect a downshift in the IPD mode whereas a downshift is automatically effected as the running condition varies in the EPD mode. Therefore, an allowable level of gearshift shock is relatively large in the IPD mode, but is small in the EPD mode. Some vehicles have D and S buttons associated with the automatic transmission, the D button being pressed to select slow gearshifts and the S button being pressed to select sporty gearshifts. If a power-off/downshift is effected by switching on and off these buttons, then it is appropriate to think that the driver does not operate these buttons with a view to effecting a downshift, and such a power-off/downshift is assumed to be caused in the EPD mode.

While the gear shift map of FIG. 2 is shown as having one upshifting curve and one downshifting curve, the gear shift map actually has a plurality of upshifting curves and a plurality of downshifting curves dependent on the number of gear positions available in the transmission.

When the running condition point in the gear shift map goes across the upshifting or downshifting curve, the controller 30 applies operating signals over the signal lines 31a, 31b to the solenoid valves 22, 23 to operate the hydraulic pressure control valve assembly 20 to supply hydraulic pressure to and discharge hydraulic pressure from the hydraulically operated clutches 11c through 11d for effecting an upshift or a downshift.

Figure 3:
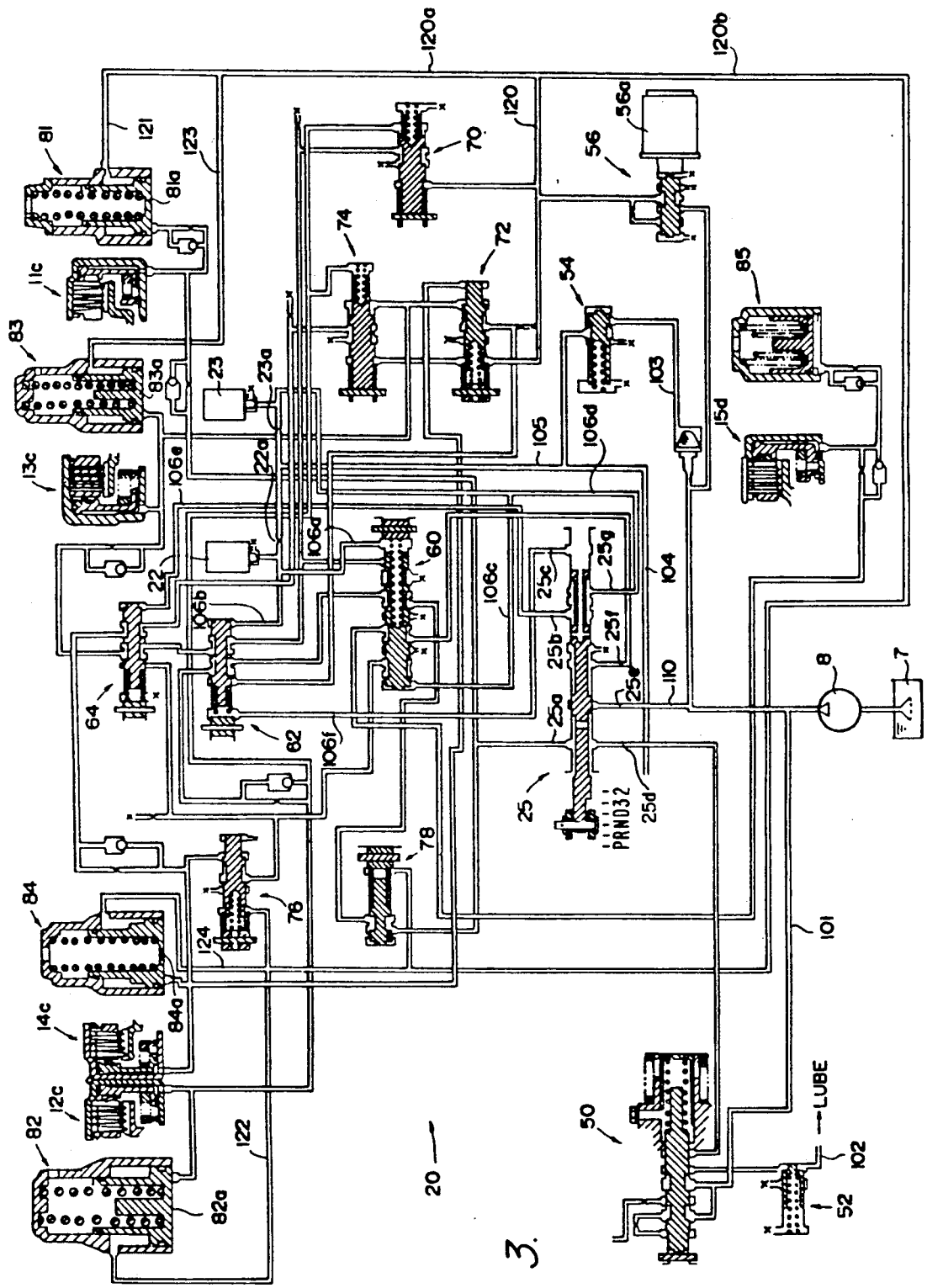
FIG. 3 is a circuit diagram of a hydraulic circuit for controlling gearshifts in the automatic transmission.

The hydraulic pressure control valve assembly 20 will be described below with reference to FIG. 3.

The control valve 20 delivers operating oil supplied from an oil sump 7 by a pump 8 to a regulator valve 50 via a line 101, and the pressure of the delivered operating oil is regulated into a predetermined line pressure by the regulator valve 50. The line pressure is applied via a line 110 to the manual spool valve 25 which then selectively supplies the line pressure to the gear position clutches 11c, 12c, 13c, 14c, 15d to control these clutches, dependent on operation of the manual spool valve 25 and various other valves in the control valve assembly 20 according to running conditions of the motor vehicle.

The various valves in the control valve assembly 20 will be described below. The control valve assembly 20 includes a check valve 52 disposed downstream of the regulator valve 50 for preventing the oil of lubricating oil supplied to various parts of the automatic transmission AT via a line 102 from rising beyond a predetermined pressure level. A modulator valve 54 reduces the line pressure fed from a line 103 to produce a prescribed modulator pressure. The modulator valve 54 then supplies working oil under the modulator pressure via a line 104 to a lockup clutch control circuit (not shown) of the torque converter 2 and also via a line 105 to the first and second solenoid valves 22, 23 for controlling operation of shift valves.

The manual spool valve 25 is operated in interlinked relation to the shift lever 45 that is manually moved by the driver. The manual valve 25 is selectively positioned in any one of six positions P, R, N, D, S, 2 for selectively supplying the line pressure from the line 110 to lines 25a through 25g.

When the manual valve 25 is in any one of the positions D, S, 2, a 1-2 shift valve 60, a 2-3 shift valve 62, and a 3-4 shift valve 64 are controlled by the modulator pressure supplied via lines 106a through 106f dependent on whether the first and second solenoid valves 22, 23 are turned on or off, for controlling the supply of the line pressure to and the discharge of the line pressure from the clutches 11c, 12c, 13c, 14c for the first through fourth gear positions, respectively.

The lines 106a, 106b are connected to the first solenoid valve 22 and also to the line 105 through an orifice 22a. When the solenoid of the first solenoid valve 22 is de-energized, its port leading to a drain is closed, and working oil under the modulator pressure is supplied from the line 105 to the lines 106a, 106b. When the solenoid of the first solenoid valve 22 is energized, the drain port thereof is opened to reduce the pressure in the lines 106a, 106b substantially to zero. The lines 106c through 106f are connected to the second solenoid valve 23 and also to the line 105 via an orifice 23a. When the solenoid of the second solenoid valve 23 is turned off, the drain port thereof is closed to allow the working oil under the modulator pressure to be supplied from the line 105 to the lines 106c through 106f. When the solenoid of the second solenoid valve 23 is turned on, the drain port thereof is opened to reduce the pressure in the lines 106c through 106f substantially to zero.

The line 106a is connected to the righthand end (as shown) of the 1-2 shift valve 60, the line 106b is connected to the righthand end of the 2-3 shift valve 62, the line 106c is connected to the lefthand end of the 1-2 shift valve 60, the line 106e is connected to the righthand end of the 3-4 shift valve 64, and the line 106f is connected to the lefthand end of the 2-3 shift valve 62. The lines 106e, 106f are coupled to the second solenoid valve 23 through the manual valve 25 and the line 106d. Therefore, by controlling the operation of the first and second solenoid valves 22, 23 to control the supply of the modulator pressure from the line 105 to the lines 106a through 106f, the operation of the 1-2, 2-3, and 3-4 shift valves 60, 62, 64 can be controlled to selectively supply the line pressure fed from the line 110 via the manual valve 25 to the hydraulically operated clutches 11c, 12c, 13c, 14c for selecting a desired gear position.

The control valve assembly 20 also has first, second, third, and fourth orifice control valves 70, 72, 74, 76 for releasing hydraulic pressure from the hydraulic pressure chamber in the clutch associated with a previous gear position in timed relation to the development of a pressure buildup in the hydraulic pressure chamber in the clutch associated with a next gear position, when a gear shift is effected. More specifically, the first orifice control valve 7 controls the timing of releasing the hydraulic pressure from the third-gear-position clutch when a downshift is effected from the third gear position to the second gear position. The second orifice control valve 72 controls the timing of releasing the hydraulic pressure from the second-gear-position clutch when an upshift is carried out from the second gear position to the third gear position or from the second gear position to the fourth gear position. The third orifice control valve 74 controls the timing of releasing the hydraulic pressure from the fourth-gear-position clutch upon a downshift from the fourth gear position to the third gear position or from the fourth gear position to the second gear position. The fourth orifice control valve 76 controls the timing of releasing the hydraulic pressure from the third-gear-position clutch at the time of an upshift from the third gear position to the fourth gear position.

The control valve assembly 20 further includes accumulators 81, 82, 83, 84 having pressure bearing chambers communicating respectively with the hydraulic pressure chambers of the hydraulically operated clutches 11c, 12c, 13c, 14c. The accumulators 81, 82, 83, 84 also have back pressure chambers opposite to the respective pressure bearing chambers with pistons 81a, 82a, 83a, 84a therebetween, the back pressure chambers being connected to respective lines 121, 122, 123, 124 which are coupled to the linear solenoid valve 56 via lines 120a, 120a and a line 120.

The linear solenoid valve 56 has a linear solenoid 56a. A current supplied to the linear solenoid 56a is controlled to control the operating force of the linear solenoid valve 56 for controlling the magnitude of a hydraulic pressure (control pressure $P_{TH}$) to be supplied to a line 120. By controlling the current supplied to the linear solenoid 56a, therefore, the hydraulic pressure in the back pressure chambers of the accumulators 81 through 84 can be controlled to control the hydraulic pressure in the hydraulic pressure chamber in an engaged clutch.

A clutch pressure control valve 78 is disposed in a line extending from the manual valve 25 to the 1-2 shift valve 60, and is operated under the control pressure $P_{TH}$ as regulated by the linear solenoid valve 56. The line pressure supplied through the shift valves 60, 62, 64 to the hydraulically operated clutches 11c, 12c, 13c, 14c is controlled by the clutch pressure control valve 78 depending on the control pressure $P_{TH}$. At times when no gearshifts are effected, the control pressure $P_{TH}$ is controlled so as to correspond to the engine output power, so that the line pressure for operating the clutches may be as low as possible, just enough to produce a necessary torque corresponding to the engine output power.

In the hydraulic pressure control valve assembly 20 thus constructed, the manual valve 25 is operated by the shift lever 45 and the solenoid valves 22, 23 are turned on and off to selectively supply the line pressure to the hydraulically operated clutches 11c, 12c, 13c, 14c for automatically selecting a gear position.

The manner in which an engaging torque for each of the clutches of the automatic transmission is determined will be described below.

Figure 4:
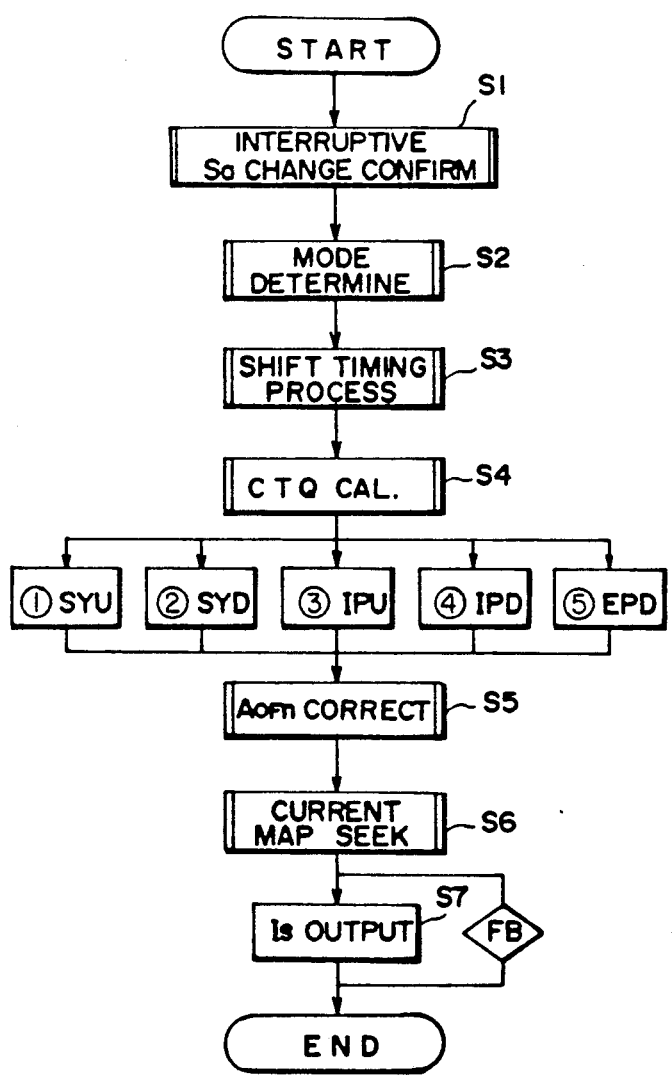
FIGS. 4, 5, 6A and 6B are flowcharts showing a control sequence for determining a clutch engaging torque and hydraulic pressure according to the present invention.

FIG. 4 shows a main control sequence for determining a clutch engaging torque. First, a step S1 confirms an interrupt process at the time gearshift commands are successively applied in a short period of time, such as for shifting gears from 4th gear position to the third gear position to the second gear position, for example. Then, a step S2 determines those of the five shift modes shown in FIG. 2 to which the commanded gearshifts correspond. Then, a step S3 determines a timing for controlling the clutch engaging torque, a timing for retarding the engine output power, or the like in each of the shift modes.

Thereafter, a step S4 calculates the engaging torque CTQ for each of the clutches, and the clutch engaging torques for gearshifts is determined based on the timing determined in the step S3 in the respective shift modes. In order to produce the clutch engaging torque in each of the clutches, the control pressure $P_{TH}$ is controlled by the linear solenoid valve 56 to control the back pressure of each of the accumulators. At this time, the back pressure is corrected for the preload produced by a spring acting on the piston in each of the accumulators and also for a centrifugal hydraulic pressure which is developed in the hydraulic pressure chamber of each clutch when the clutch rotates ($A_{OFn}$ correction).

After the desired engaging torque is determined and the control pressure $P_{TH}$ required to obtain the engaging torque is calculated, a necessary current Is to be supplied is sought from a map of linear solenoid currents and control pressures $P_{TH}$ in a step S6, and the current Is is supplied for feedback control in a step S7.

The calculation in the step S4 of the clutch engaging torque CTQ in the above main control sequence will be described below with reference to the flowchart of FIG. 5.

First, an engine output torque ETQ corresponding to the engine rotational speed and the intake vacuum at the time of a gearshift is read from a predetermined engine output map of engine rotational speeds Ne and intake vacuums $P_B$ in a step S41. Since the engine output power is retarded in order to effect a smooth gearshift, the engine output power is corrected to such an output retard in a step S42. Since the engine output power is transmitted to the automatic transmission through a torque converter, the engine output power is further corrected for a torque increase caused by the torque converter in a step S43.

After the engine torque ETQ to be transmitted to the input shaft of the transmission has thus been calculated and corrected as described above, it is determined whether the gearshift at this time is in an inertia torque requiring mode (specifically the IPU or IPD mode). If in the inertia torque requiring mode, then an inertia torque ITQ is calculated in a step S45.

The inertia torque ITQ is a torque required to rotate the inertia of the input member of the clutch which is engaged in the gearshift, depending on the rate of change of the engine rotational speed which is determined from the relationship between a change in the engine rotational speed caused by the gearshift and a desired gearshift time required for the gearshift. Thus, the inertia torque ITQ is calculated based on the engine rotational speed. the desired gearshift characteristics, and the input member inertia at the time of the gearshift.

If in the inertia torque requiring mode, the inertia torque ITQ calculated in the step S45 is added to the engine torque ETQ to determine a torque to be transmitted to the transmission input shaft.

After the transmission input shaft torque is determined for each gearshift mode, the torque is corrected for a hydraulic pressure buildup time and an oil temperature in a step S46 (DTQ correction). More specifically, even if the hydraulic pressure is supplied to the clutch at the time of starting to effect a gearshift, there is a time delay before the oil reaches the hydraulic pressure chamber of the clutch and starts to engage the clutch. Therefore, during an initial period of the gearshift, the supplied hydraulic pressure is increased to increase the speed at which the hydraulic pressure is supplied to the clutch thereby shortening the time delay. This correction is effected for a prescribed interval of time after the gearshift is started. The amount of such correction varies with the oil temperature since the time delay differs depending on the viscosity of the oil which depends on the oil temperature.

Since the torque thus calculated is the transmission input shaft torque, it is converted into a torque shared by the clutch used for effecting the gearshift in a step S47. and then a force for pressing the clutch piston, which is required to produce the torque share, is calculated from the relationship between the coefficient $\mu$ of friction and peripheral speed V of the clutch plates of the clutch in a step S48.

Once the required piston pressing force is calculated, a hydraulic pressure needed by the clutch can be calculated. A control pressure $P_{TH}$ as an accumulator back pressure for developing the hydraulic pressure is then determined. The necessary clutch pressure is offset from the control pressure $P_{TH}$ by an amount corresponding to the preload of the spring of the accumulator, and a centrifugal hydraulic pressure is developed in the clutch hydraulic pressure chamber since the clutch is rotating. Therefore, the clutch engaging torque is corrected for the offset and the centrifugal hydraulic pressure in the $A_{OFn}$ correction at the step S5 shown in FIG. 5.

Figures 6A, 6B:
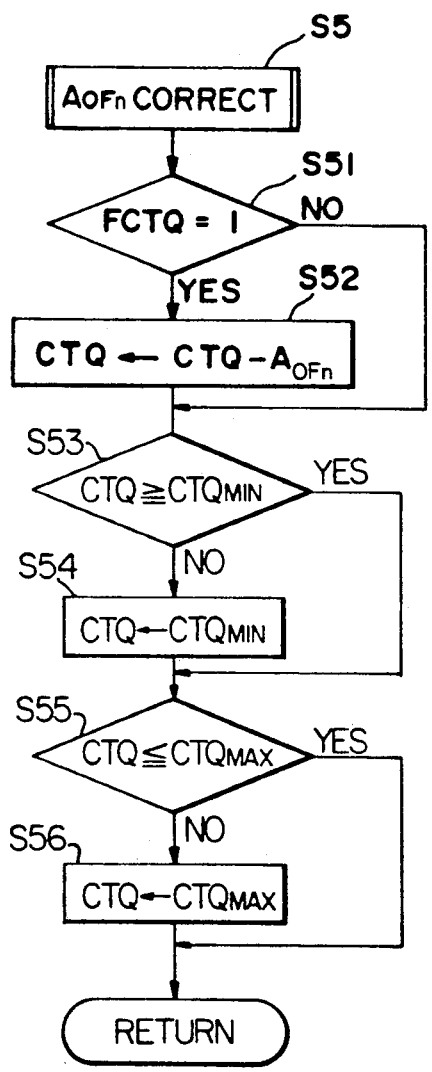

The $A_{OFn}$ correction will be described below with reference to the flowchart of FIG. 6A.

This correction is effected when a flag FCTQ, which is set at the time of calculating the clutch engaging torque CTQ, is FCTQ=1. If FCTQ=1 in a step S51, then a corrective amount $A_{OFn}$ is calculated, and a value produced by subtracting the corrective amount $A_{OFn}$ from the torque CTQ which has been calculated in the CTQ calculating routine (step S4) is set as the clutch engaging torque CTQ.

The corrective amount $A_{OFn}$ is used to correct the torque for the preload of the spring in the accumulator and the centrifugal hydraulic pressure. The spring preload can be recognized as being of a constant value depending on each of the accumulators, and the centrifugal hydraulic pressure can be recognized as having a value corresponding to the square of the rotational speed of the hydraulically operated clutch coupled to each accumulator. If the vehicle speed is known, the rotational speed of each of the hydraulically operated clutches can be derived from the vehicle speed since the gear ratio is known. Therefore, as shown in FIG. 6B, there is provided a table having a plurality of vehicle speed ranges and corrective amounts for the hydraulically operated hutches in the respective vehicle speed ranges. The corrective amounts in the table are of values corresponding to the sums of the average centrifugal hydraulic pressures in the vehicle speed ranges and the preloads of the springs. If the vehicle speed and the hydraulically operated clutch in operation are known, therefore, a necessary $A_{OFn}$ corrective amount can be read from the table.

There have been established in advance a minimum value $CTQ_{MIN}$ and a maximum value $CTQ_{MAX}$ for the clutch engaging torque CTQ which has been subjected to the $A_{OFn}$ correction. If the corrected torque CTQ is smaller than the minimum value $CTQ_{MIN}$, then the minimum value $CTQ_{MIN}$ is set as the torque CTQ in steps S53, S54. If the corrected torque CTQ is larger than the maximum value $CTQ_{MAX}$, the maximum value $CTQ_{MAX}$ is set as the torque CTQ in steps S55, S56.

A gearshift to be effected after the clutch engaging torque CTQ has thus been determined will be described in specific detail with reference to the IPU and IPD modes.

Figure 7A:
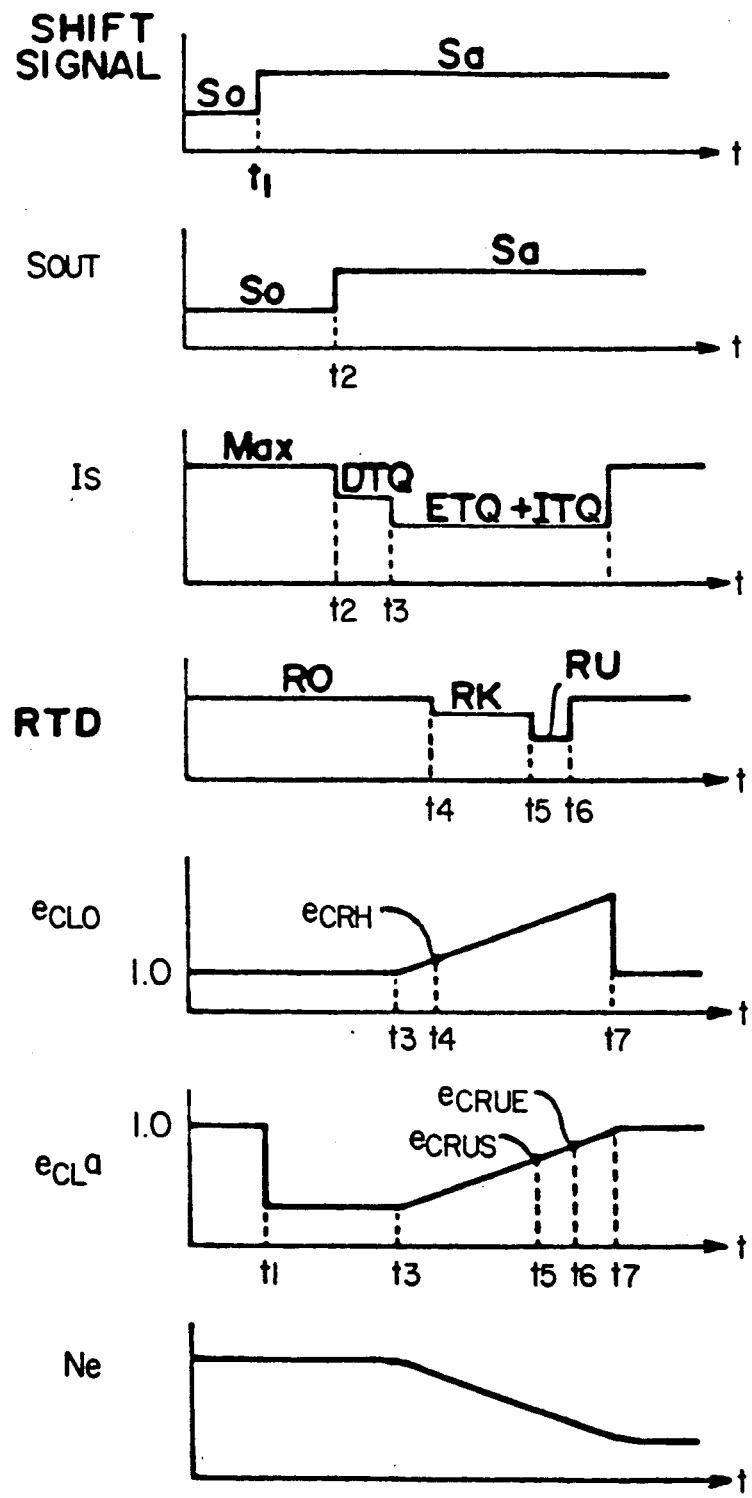
FIGS. 7A and 7B are graphs showing how gearshift control is effected depending on a gearshift mode.

In the IPU mode, as shown in FIG. 7A, when a gearshift command is issued at a time $t_1$ from a present gear position So to a target gear position Sa across the upshift curve $L_U$, the shift solenoid output is changed to the target gear position Sa at a time $t_1$ after elapse of the time set by a decision timer $T_1$. In the IPU mode, when the present-gear-position clutch (previous-gear-position clutch) is disengaged, the engine rotational speed varies such that the rotational speeds of the input and output members of the target-gear-position clutch (next-gear-position clutch) vary away from a synchronized speed. In view of this, the next-gear-position clutch should start to be engaged immediately in order to cause the engine rotational speed to approach the synchronized speed.

To this end. the current Is to be supplied to the linear solenoid is set, from this time on, to a value corresponding to the sum of the engine torque ETQ and the inertia torque ITQ. However, since it takes a certain time after the shift solenoid is energized until the hydraulic pressure is supplied to the next-gear-position clutch, resulting in a time delay before the clutch starts to be engaged. a current corresponding to a torque DTQ greater than the torque (ETQ+ITQ) is set after the time t. until the ratio $e_{CLa}$ between the rotational speeds of the input and output members of the next-gear-position clutch begins to vary, i.e., until a time $t_3$ when the next-gear-position clutch starts being engaged, so that the time delay will be shortened. Thereafter, the current Is returns to its maximum value at a time $t_7$ when the rotational speed ratio $e_{CLa}$ becomes substantially 1.

According to the present control sequence, when the engaging clutch is subjected to a slip greater than a predetermined amount, the engine output power is retarded by a certain amount (indicated by RK). The engine output power regard RK is started from a time $t_4$ when the rotational speed ratio $e_{CLo}$ between the input and output members of the previous-gear-position clutch increases beyond a prescribed value $e_{CRH}$. An amount of retard RU, which is greater than the amount of retard RK, is established from a time $t_5$ when the rotational speed ratio $e_{CLa}$ exceeds a reference value $e_{CRUS}$ to a time $t_6$ when the ratio $e_{CLa}$ exceeds a reference value $e_{CRUE}$, so that the hydraulically operated clutch will be smoothly engaged completely.

Figure 7B:
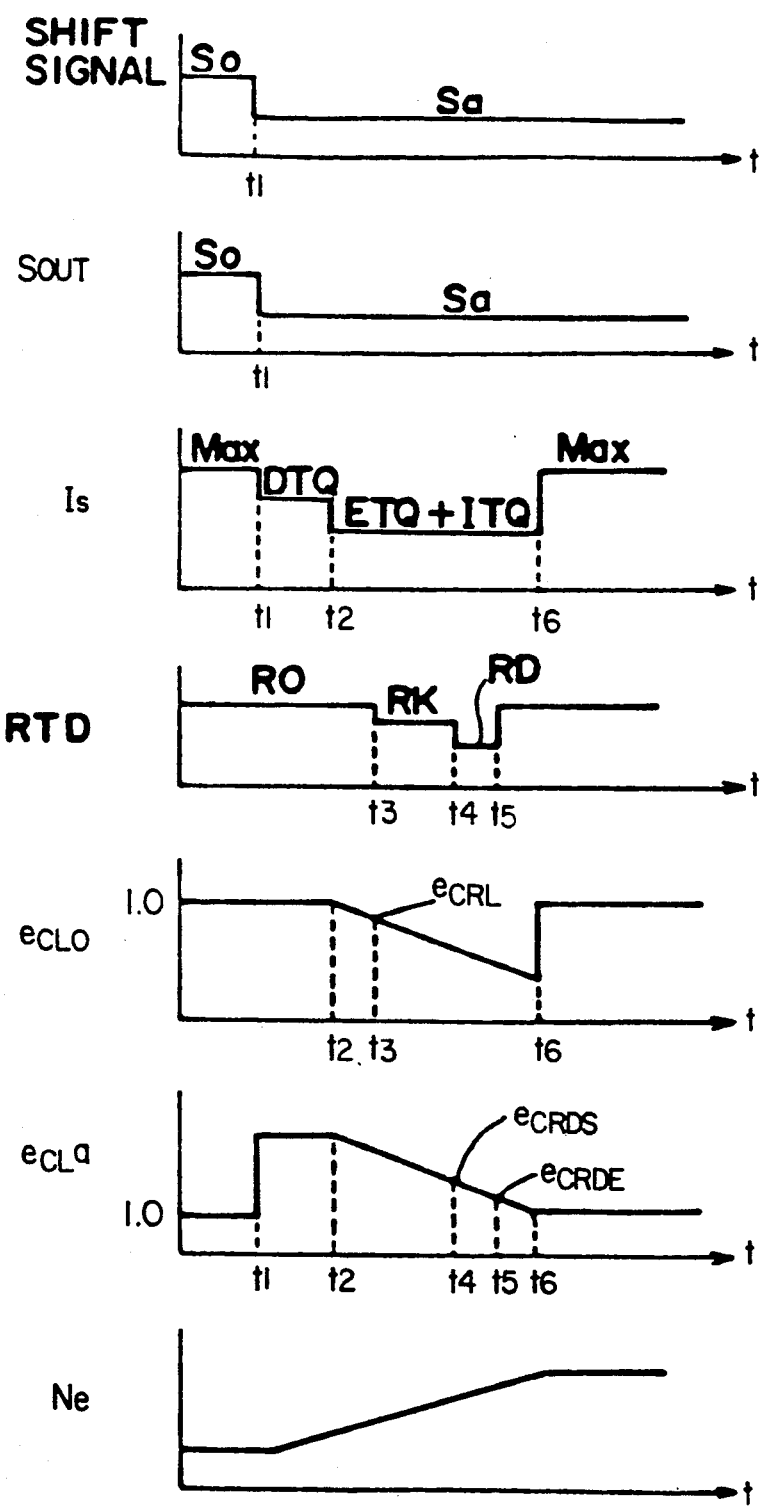

In the IPD mode, as shown in FIG. 7B, when a gearshift command is issued at a time $t_1$ from a present gear position So to a target gear position Sa across the downshift curve $L_D$, the shift solenoid output is immediately changed to the target gear position Sa. In the IPD mode, when the present-gear-position clutch (previous-gear-position clutch) is disengaged, the engine rotational speed varies such that the rotational speeds of the input and output members of the target-gear-position clutch (next-gear-position clutch) vary away from a synchronized speed. In view of this, the next-gear-position clutch should start to be engaged immediately.

To this end, the current Is to be supplied to the linear solenoid is set, from this time $t_1$ on, to a value corresponding to the sum of the engine torque ETQ and the inertia torque ITQ. However, because of a time delay after the shift solenoid is energized until the next-gear-position clutch starts to be engaged, a current corresponding to a torque DTQ greater than the torque (ETQ+ITQ) is set after the time $t_1$ until a time $t_2$ when the ratio $e_{CLa}$ between the rotational speeds of the input and output members of the next-gear-position clutch begins to vary. Thereafter, the current Is returns to its maximum value at a time $t_6$ when the rotational speed ratio $e_{CLa}$ becomes substantially 1.

According to the present control sequence, too, when the engaging clutch is subjected to a slip greater than a predetermined amount, the engine output power is retarded by a certain amount (indicated by RK). The engine output power regard RK is started from a time $t_3$ when the rotational speed ratio $e_{CLo}$ between the input and output members of the previous-gear-position clutch decreases below a prescribed value $e_{CRL}$. An amount of retard RD, which is greater than the amount of retard RK, is established from a time $t_4$ when the rotational speed ratio $e_{CLa}$ drops below a reference value $e_{CRDS}$ to a time $t_5$ when the ratio $e_{CLa}$ falls below a reference value $e_{CRDE}$.

In the above embodiment, the clutch pressure which determines the clutch engaging torque is controlled using the control pressure $P_{TH}$ acting as the accumulator back pressure. However, the present invention is not limited to such an arrangement. The clutch pressure may be directly controlled by the linear solenoid valve. In such a modification, the correction of the clutch pressure for the offset due to the preload of the accumulator spring is dispensed with. The control pressure may be generated by a duty-ratio-controlled solenoid valve, rather than the linear solenoid valve.

Figure 8:
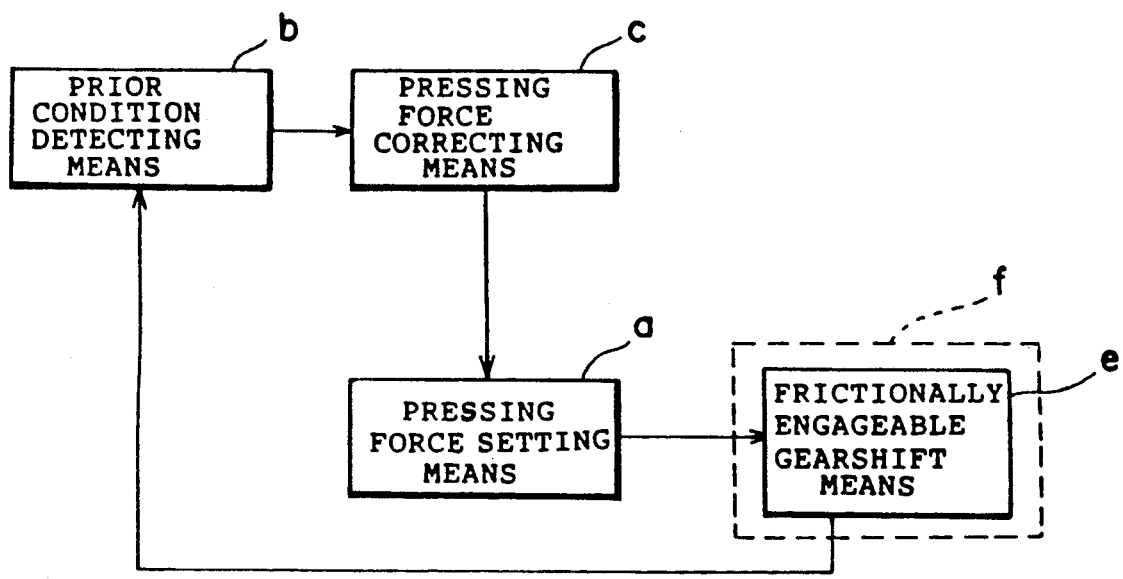
FIG. 8 is a block diagram of a gearshift control apparatus according to the present invention.

A gearshift control apparatus according to a second embodiment of the present invention will be described below. As shown in FIG. 8, the gearshift control apparatus of the second embodiment, which controls a power transmitting means (transmission) f having a plurality of frictionally engageable gearshift means e (e.g., friction clutches) for selecting a power transmission path, includes a pressing force setting means a for releasing a force (e.g., clutch operating hydraulic pressure) to press friction members of a previous-gear-position frictionally engageable gearshift means e and setting a force to press friction members of a next-gear-position frictionally engageable gearshift means e when a gearshift is to be effected, an immediately prior condition detecting means b for detecting a condition immediately before input and output rotatable members of the frictionally engageable gearshift means e are directly coupled through frictional engagement based on the rotation of the input and output rotatable members, and a gearshift engaging force correcting means c for lowering the force to press the friction members of the next-gear-position frictionally engageable gearshift means e, which force has been set by the pressing force setting means a, until a prescribed period of time elapses from the time when the condition immediately before the input and output members of the next-gear-position frictionally engageable gearshift means e are directly coupled is detected by the immediately prior condition detecting means b.

When a gearshift is to be effected, the force to press the friction members of the previous-gear-position frictionally engageable gearshift means e is released by the pressing force setting means a, and a force to press the friction members of the next-gear-position frictionally engageable gearshift means e is set by the pressing force setting means a, for shifting gears from a previous gear position to a next gear position. At this time, the immediately prior condition detecting means b detects whether the input and output rotatable members of the frictionally engageable gearshift means e are in a condition immediately before they are directly coupled through frictional engagement, or not, based on the rotation of the input and output rotatable members. When the condition immediately before the input and output rotatable members of the next-gear-position gearshift means e are directly coupled is detected by the immediately prior condition detecting means b, the force to press the friction members of the next-gear-position gearshift means e is lowered by the pressing force correcting means c until a prescribed period of time elapses after the condition has been detected. An increase in the coefficient of friction (final dynamic coefficient of friction) immediately before the input and output rotatable members are directly coupled is canceled out by the reduction in the pressing force. Accordingly, variations in the torque transmitted immediately before the gearshift means e is directly coupled are suppressed, and the gearshift can be smoothly effected without gearshift shocks.

Figure 9:
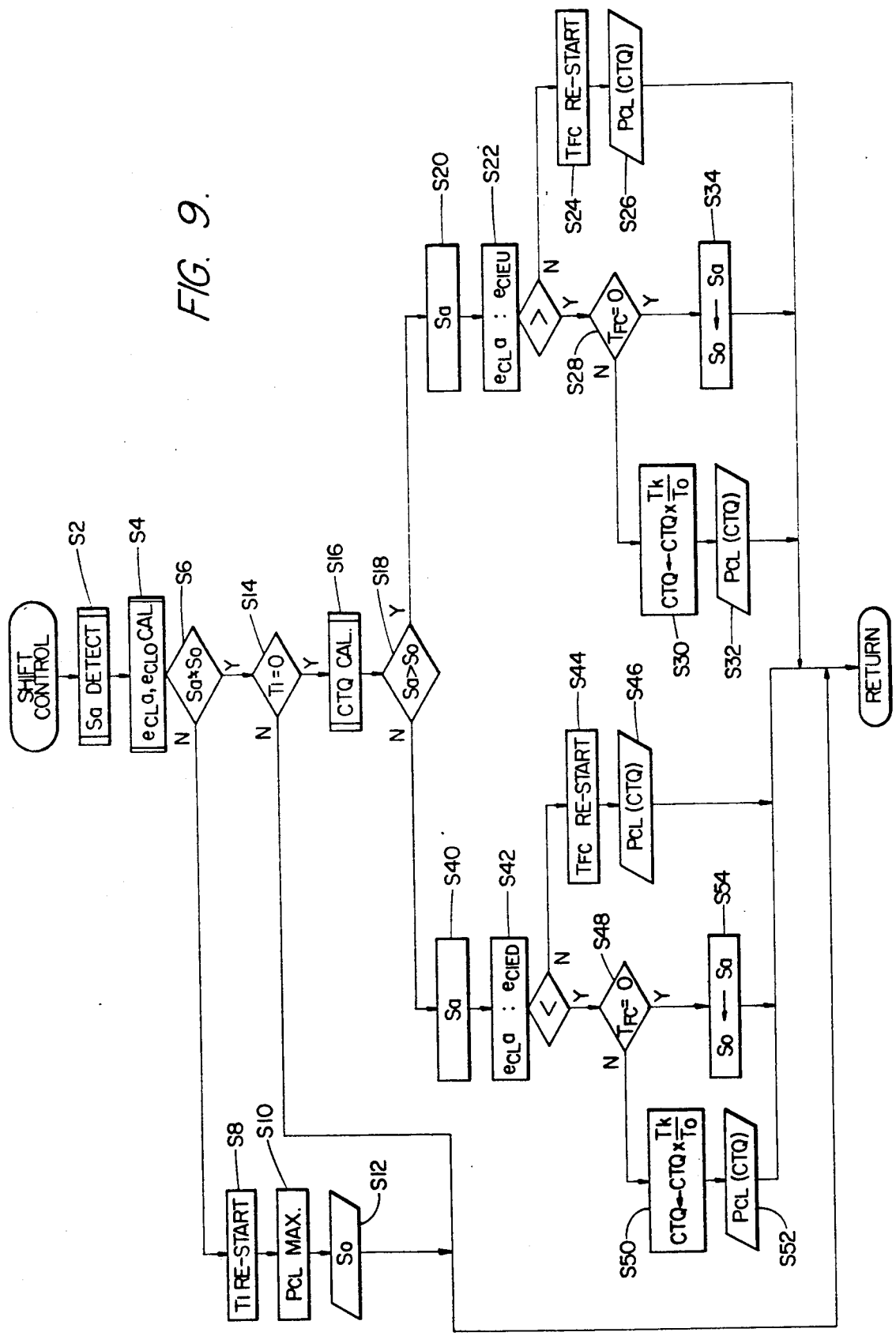
FIG. 9 is a flowchart of a control sequence of the gearshift control apparatus.

The above control process will be described in detail with reference to the flowchart of FIG. 9 and the graph of FIG. 10.

A step S2 seeks or detects a target gear position Sa with respect to a present gear position So from a shift map, and then a step S4 calculates an input and output rotational speed ratio $e_{CLo}$ of the present-gear-position gearshift clutch and an input and output rotational speed ratio $e_{CLa}$ of the target-gear-position gearshift clutch. Then, a step S6 determines whether the gear positions So, Sa are equal to each other or not. The gear positions So, Sa are equal to each other if no gearshift command is issued. In this case, control goes to steps S8 through S12 in which a gearshift decision timer $T_1$ is re-started, the clutch pressure $P_{CL}$ for the present-gear-position clutch is set to a maximum value, and a signal to keep the present gear position So is issued to the shift solenoid.

Figure 10:
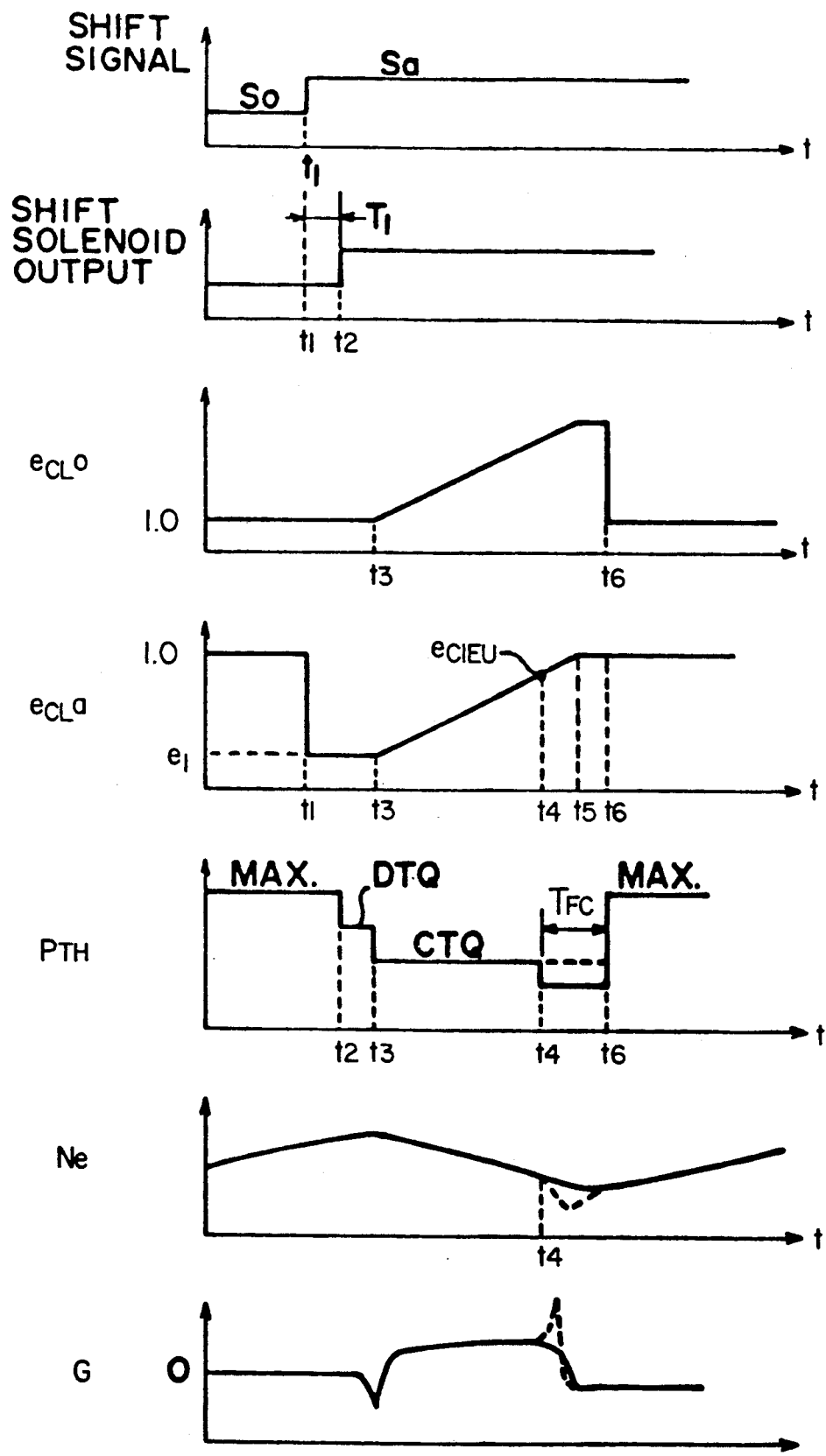
FIGS. 10 and 12 are graphs showing how various control values vary with respect to time in the control sequence of FIG. 9.

Such a condition is shown in FIG. 10 up to a time $t_1$. A gearshift command from the controller 30 and outputs from the shift solenoids 22, 23 are to keep the present gear position So. Therefore, the present gear position So and the target gear position Sa are the same as each other, and the input and output rotational speed ratio $e_{CLo}$, $e_{CLa}$) of the gearshift clutch is 1.0. The control pressure $P_{TH}$ is set to a maximum value by the linear solenoid valve 56, and hence the clutch pressure $P_{CL}$ for the hydraulically operated clutch (gearshift means) which selects the present gear position is maximized.

The force applied by the clutch piston of this clutch to press the friction discs is therefore maximized, and so is the torque CTQ transmitted by this clutch.

If a gearshift command is then issued, a new target gear position Sa is established, resulting in a condition Sa≠So. When the gearshift command is detected, control proceeds to a step S14 which waits for the elapse of a time set by the gearshift decision timer $T_1$ from the time the gearshift command has been issued. Control then goes from the step S14 to a step S16. The gearshift decision timer $T_1$ is used to prevent gearshifts from being effected too quickly in the event that different gearshift commands are successively issued in a short period of time. For example, if a gearshift command for a gearshift from the third gear position to the second gear position is issued before the time set by the gearshift decision timer $T_1$ expires after a gearshift command for a gearshift from the fourth gear position to the third gear position has been issued, then a gearshift from the fourth gear position to the second gear position is actually carried out upon elapse of the time set by the gearshift decision timer $T_1$.

In the step S16, the clutch engaging torque CTQ for the target-gear-position clutch is calculated. The clutch engaging torque CTQ is a torque needed to effect the desired gearshift smoothly, and can be calculated in the same manner as described above with reference to the flowchart of FIG. 5.

Then, control goes to a step S18 which determines whether Sa>So, i.e., an upshift is to be effected or not. If an upshift is to be effected, then control goes to a step S20 in which a shift solenoid output is switched from So to Sa for actually starting an upshift. As shown in FIG. 10, if a gearshift command for a gearshift from the present gear position So to the target gear position Sa is issued at the time $t_1$, then the shift solenoid output changes from So to Sa at a time $t_2$ upon elapse of the time set by the gearshift decision tier $T_1$ at the step S14. When the gearshift command is issued at the time $t_1$, the target gear position Sa is changed to the gear position according to the gearshift command. Therefore, the input and output rotational speed ratio $e_{CLa}$ of the target-gear-position (next-gear-position) clutch is changed to a value $e_1$ for the clutch at the target gear position.

When the shift solenoid output changes to Sa at the time $t_2$, the shift valve is operated to interrupt the supply of the hydraulic pressure to the hydraulically operated clutch for the preset gear position (previous gear position). The clutch pressure $P_{CLo}$ sharply drops to a preset pressure of the accumulator corresponding to this clutch. At the same time, the hydraulic pressure or clutch oil pressure starts being supplied to the hydraulically operated clutch for the target gear position at the time $t_2$.

Figure 11:
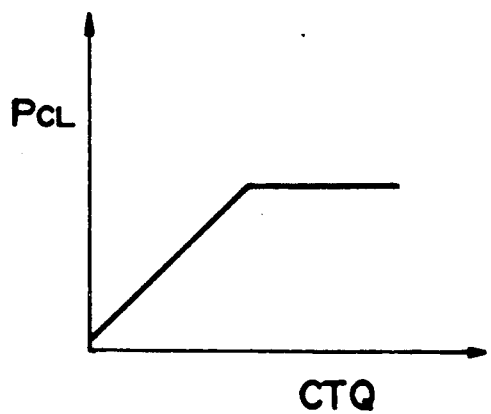
FIG. 11 is a graph showing the relationship between a clutch pressure $P_{CL}$ and a clutch torque $CT_Q$.

The clutch pressure $P_{CL}$ at this time is based on the control pressure $P_{TH}$ set by the linear solenoid valve 56. The clutch torque CTQ corresponding to the clutch pressure $P_{CL}$ is determined based on the pressure bearing area of the clutch piston and the return spring force as shown in FIG. 11. Therefore, the control pressure $P_{TH}$ may be selected to obtain the detail torque CTQ. The control pressure $P_{TH}$ may be selected to be a pressure $P_{TH}(CTQ)$ which produces the torque CTQ necessary for the gearshift that is calculated in the step S16. Even when the shift solenoid output changes to the target gear position Sa, the target-gear-position clutch does not start being engaged and hence a time lag is produced until clutch oil is filled in the pipe connected to the target-gear-position clutch and this clutch is moved for an ineffective stroke. In order to reduce such a time lag, a torque DTQ greater than the calculated torque CTQ is established until the clutch actually being engaged (i.e., the input and output rotational speed ratio $e_{CLo}$ of the present-gear-position clutch starts to vary), and a control pressure $P_{TH}$ (CTQ) for producing such a torque DTQ is determined. When the input and output rotational speed ratios $e_{CLo}$, $e_{CLa}$ of the present-gear-position and target-gear-position clutches start to vary to start engaging the target-gear-position clutch at the time $t_3$, the control pressure $P_{TH}(CTQ)$ for producing the calculated torque CTQ is established.

In this gearshift, the frictional engagement of the present-gear-position clutch is released to allow the input and output rotational speed ratio $e_{CLo}$ thereof to increase from 1.0, and the target-gear-position clutch starts being engaged to allow the input and output rotational speed ratio $e_{CLa}$ to vary from $e_1$ to 1.0. A step S22 determines whether the target-gear-position clutch has reached a condition immediately before it is directly coupled by comparing the input and output rotational speed ratio $e_{CLa}$ thereof with a threshold $e_{CIEU}$ slightly smaller than 1.0. If $e_{CLa} \leq e_{CIEU}$, control goes to steps S24 and S26 in which a fully direct coupling decision timer $T_{FC}$ is re-started, and a clutch pressure $P_{CL}$ (CTQ) (i.e., the control pressure $P_{TH}$ (CTQ)) for keeping the torque CTQ calculated in the step S16 is determined.

Figure 13:
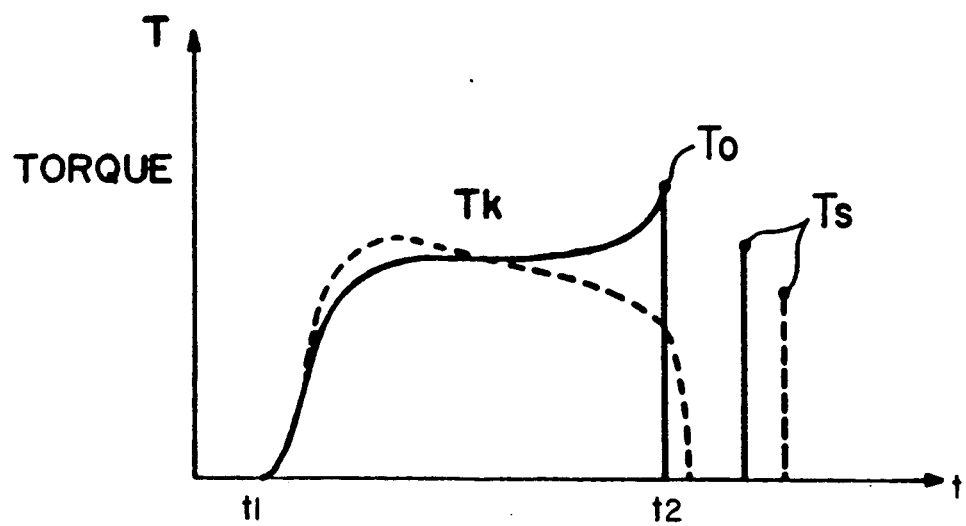
FIG. 13 is a graph showing the results of a test conducted on a friction clutch by a friction testing machine.

If $e_{CLa} > e_{CIEU}$, i.e., if the target-gear-position clutch has reached a condition immediately before it is directly coupled, the fully direct coupling decision timer $T_{FC}$ is started in a step S28, and the torque CTQ is corrected in a step S30 and a clutch pressure $P_{CL}$ (CTQ) for obtaining the corrected torque CTQ is established in a step S32 until the time set by the timer $T_{FC}$ elapses. The torque correction is carried out in view of the frictional characteristics of a friction clutch (indicated by the solid lines in FIG. 13) according to which the final dynamic coefficient $\mu o$ is larger than the normal dynamic coefficient $\mu k$ of friction. The torque CTQ is corrected by multiplying the torque calculated in the step S16 by Tk/To so that the difference between the torques produced due to the different coefficients of friction (i.e., the difference between the torques Tk, To in FIG. 13) is canceled out.

therefore, as shown in FIG. 10, the clutch pressure $P_{CL}$ is lowered as indicated by the solid line from a time $t_4$ when the condition $e_{CLa} > e_{CIEU}$ is reached to a time $t_6$ when the time set by the fully direct coupling decision timer $T_{FC}$ expires. Consequently, even if this clutch is in a condition immediately before it is directly coupled, and the coefficient of friction becomes the larger final dynamic coefficient $\mu o$ of friction, the pressing force on the discs of this clutch is lowered to cancel out the increased coefficient of friction, and hence the clutch engaging torque for this clutch is not increased. Accordingly, an abrupt increase in the clutch engaging torque is prevented at the time the gearshift is finished, and the gearshift is smoothly effected.

FIG. 10 shows how the engine rotational speed Ne and the acceleration (deceleration)G applied to the vehicle body vary during the gearshift. The solid-line curves representing Ne and G in FIG. 10 indicate that the engine speed Ne and the acceleration (deceleration ) G vary relatively smoothly, and hence the gearshift is carried out smoothly. If the correction in the step S30 were not carried out and the control pressure $P_{TH}$ were established as indicated by the broken line in FIG. 10, then the torque for engaging the target-gear-position clutch would be abruptly increased immediately before it is directly coupled, so that the engine rotational speed Ne and the acceleration (deceleration) G would vary sharply as indicated by the broken lines, resulting in a gearshift shock.

Figure 12:
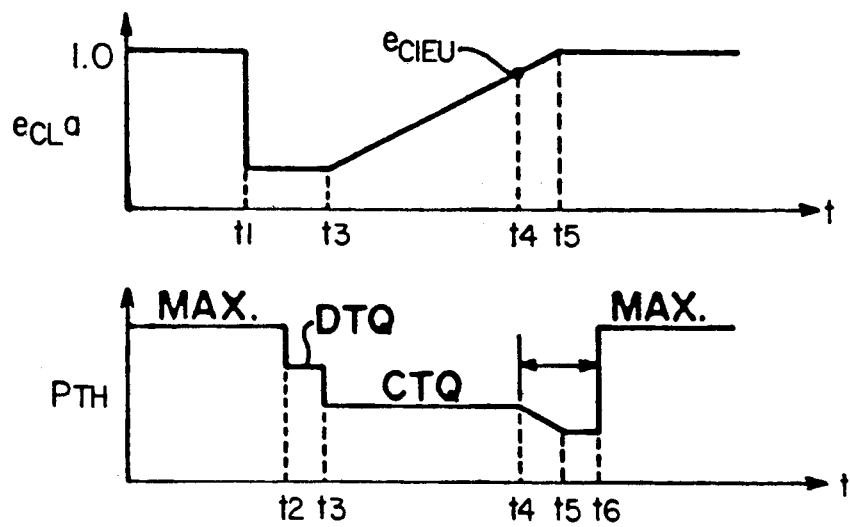

In the illustrated embodiment, the torque is corrected by multiplying the clutch pressure $P_{CL}$ by a constant value (= Tk/To). However, as shown in FIG. 12, the torque may be corrected on a real-time basis in a manner to correspond to a torque variation immediately before the clutch is directly coupled.

Thereafter, control goes from the step S28 to a step S34 in which the target gear position Sa changes to the present gear position So. In subsequent cycles, therefore, control goes from the step S6 to the steps S8 through S12, so that the clutch pressure $P_{CL}$ is maximized and the target gear position So which has changed is maintained as it is.

The above control process is directed to an upshift. However, the same control process is executed to effect a downshift.

If a downshift is determined in the step S18, then control goes to a step S40 in which the solenoid output shift solenoid output changes from So to Sa after elapse of the time set by the gearshift decision timer $T_1$ in the step S14 from the time when the gearshift command for the gearshift from the present gear position So to the target gear position Sa has been issued.

The shift valve is operated to cut off the supply the hydraulic pressure to the present-gear-position (previous-gear-position) hydraulically operated clutch whose clutch pressure $P_{CLo}$ then drops sharply, and the hydraulic pressure starts being supplied to the target-gear-position hydraulically operated clutch.

At this time, a control pressure $P_{TH}$ (CTQ) for producing a torque DTQ higher than the calculated torque CTQ is established until the clutch starts being engaged (i.e., until the input and output rotational speed ratio $e_{CLo}$ of the present-gear-position clutch starts to vary). When the input and output rotational speed ratios $e_{CLo}$, $e_{CLa}$ of the present-gear-position and target-gear-position clutches begin to vary, the control pressure $P_{TH}$ (CTQ) for producing the calculated torque CTQ is established.

In this gearshift, the frictional engagement of the present-gear-position clutch is released to allow the input and output rotational speed ratio $e_{CLo}$ thereof to decrease from 1.0, and the target-gear-position clutch starts being engaged to allow the input and output rotational speed ratio $e_{CLa}$ to reduce toward 1.0. A step S42 determines whether the target-gear-position clutch has reached a condition immediately before it is directly coupled by comparing the input and output rotational speed ratio $e_{CLa}$ thereof with a threshold $e_{CIED}$ slightly larger than 1.0. If $e_{CLa} \geq e_{CIED}$, control goes to steps S44 and S46 in which the fully direct coupling decision timer $T_{FC}$ is re-started, and a clutch pressure $P_{CL}$ (CTQ) for keeping the torque CTQ calculated in the step S16 is determined.

If $e_{CLa} < e_{CIED}$, i.e., if the target-gear-position clutch has reached a condition immediately before it is directly coupled, the fully direct coupling decision timer $T_{FC}$ is started in a step S48, and the torque CTQ is corrected in a step S50 and a clutch pressure $P_{CL}$ (CTQ) for obtaining the corrected torque CTQ is established in a step S52 until the time set by the timer $T_{FC}$ elapses. The torque CTQ is corrected by multiplying the torque calculated in the step S16 by Tk/To so that the difference between the torques produced due to the different coefficients $\mu k$, $\mu o$ of friction (i.e., the difference between the torques Tk, To in FIG. 13) is canceled out.

Therefore, as shown in FIG. 10, the clutch pressure $P_{CL}$ is lowered from the time when the condition $e_{CLA} < e_{CIED}$ is reached to the time when the time set by the fully direct coupling decision timer $T_{FC}$ expires. Consequently, even if this clutch is in a condition immediately before it is directly coupled, and the coefficient of friction becomes the larger final dynamic coefficient $\mu o$ of friction, the clutch engaging torque for this clutch is not increased. Accordingly, an abrupt increase in the clutch engaging torque is prevented at the time the gearshift is finished, and the gearshift is smoothly effected.

Thereafter, control goes from the step S48 to a step S54 in which the target gear position Sa changes to the present gear position So. In subsequent cycles, therefore, control goes from the step S6 to the steps S8 through S12, so that the clutch pressure $P_{CL}$ is maximized and the target gear position So which has changed is maintained as it is.

Figure 14:
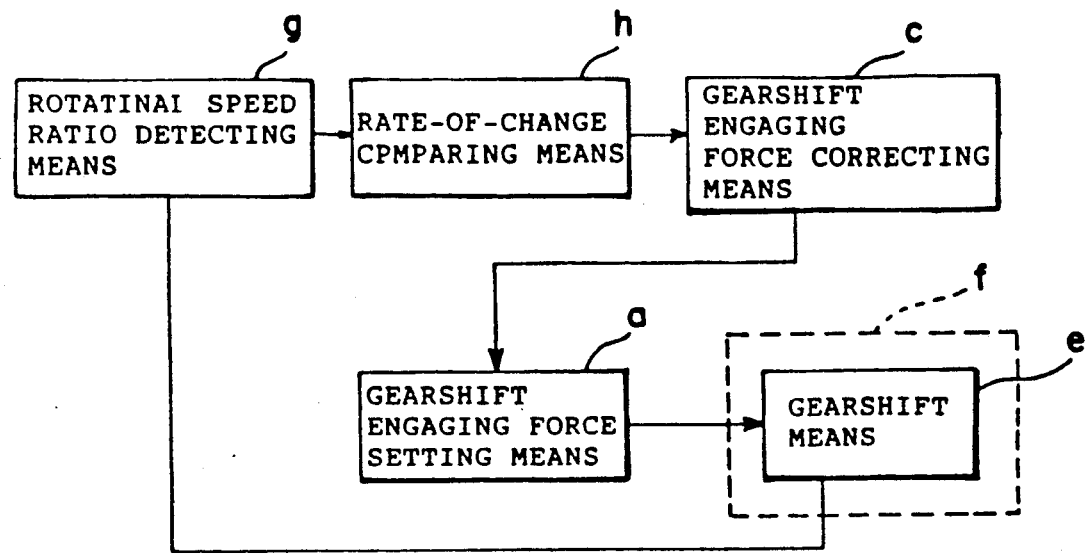
FIG. 14 is a block diagram of a gearshift control apparatus according to another embodiment of the present invention.

A gearshift control apparatus according to a third embodiment of the present invention will be described below. As shown in FIG. 14, the gearshift control apparatus of the third embodiment, which controls a power transmitting means (transmission) f having a plurality of gearshift means e for selecting a power transmission path, includes a gearshift engaging force setting means a for releasing an engaging force of a previous-gear-position gearshift means e and setting an engaging force for a next-gear-position gearshift means e, a rotational speed ratio detecting means g for detecting the input and output rotational speed ratio of the gearshift means e, a rate-of-change comparing means h for determining the rate of change of the input and output rotational speed ratio of the gearshift means e as detected by the rotational speed ratio detecting means g and comparing the determined rate of change with a reference rate of change to determine the difference therebetween, and a gearshift engaging force correcting means c for correcting the engaging force for the next-gear-position gearshift means e as set by the gearshift engaging force setting means a, depending on the determined difference between the rates of change, so that the rate of change of the input and output rotational speed ratio of the next-gear-position gearshift means e becomes closer to the reference rate of change.

When a gearshift is to be effected, the engaging force of the previous-gear-position gearshift means e is released and an engaging force for the next-gear-position gearshift means e is set by the gearshift engaging force setting means a, for making a gearshift from the previous gear position to the next gear position. At the same time, the input and output rotational speed ratio of the next-gear-position gearshift means e is detected by the rotational speed ratio detecting means g, and the rate of change of the detected input and output rotational speed ratio is compared with the reference rate of change, thus determining the difference between the compared rates of change. Depending on the difference between the rates of change, the gearshift engaging force correcting means c corrects the engaging force for the next-gear-position gearshift means as set by the gearshift engaging force setting means a so that the rate of change of the input and output rotational speed ratio of the next-gear-position gearshift means becomes closer to the reference rate of change. In this manner, the time required for the gearshift and the rate of change of the ratio between the rotational speeds of the input and output members of the gearshift means are set to desired values, with the result the gearshift can be smoothly carried out without a gearshift shock.

Figure 15A:
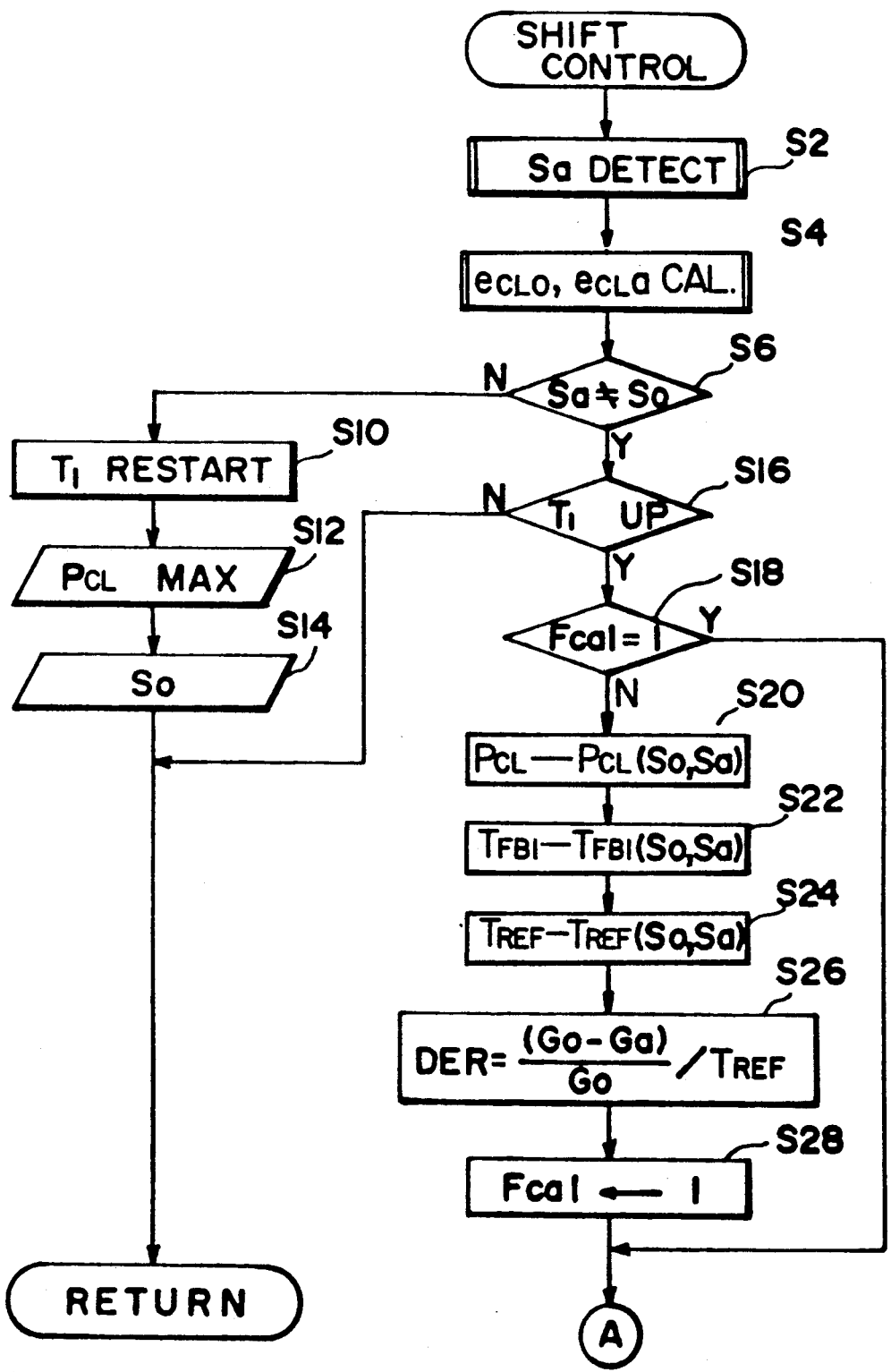
FIGS. 15A, 15B, 16A, and 16B are flowcharts of a control sequence of the gearshift control apparatus shown in FIG. 14.

The above gearshift control process will be described below with reference to the flowcharts of FIGS. 15A and 15B.

A step S2 seeks a target gear position Sa with respect to a present gear position So from a gearshift map. Then, a step S4 calculates input and output rotational speed ratios $e_{CLo}$, $e_{CLa}$ (=input rotational speed/output rotational speed) in the gear positions So, Sa.

A next step S6 determines whether the gear positions So, Sa are equal to each other or not. If Sa=So, then no gearshift command is issued. In this case, control proceeds to steps S10 through S14 in which a gearshift decision timer $T_1$ is re-started, a clutch pressure $P_{CL}$ is maximized, and the present gear position So is maintained as it is.

Figure 17A:
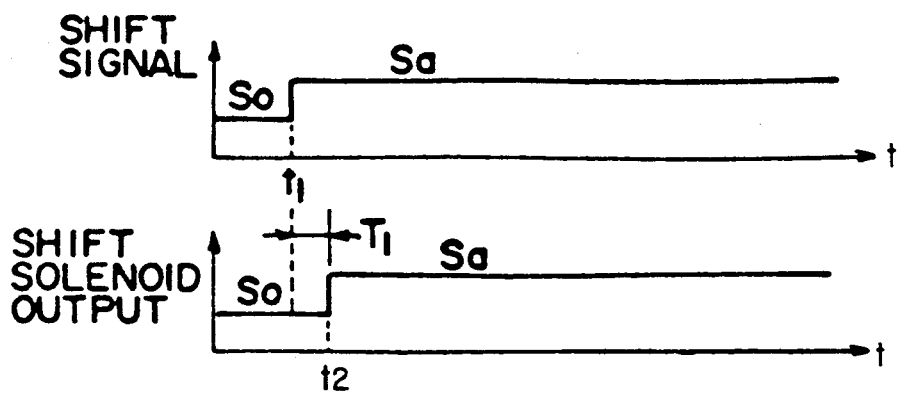
FIGS. 17A and 17B are graphs showing how various control values vary with respect to time in the control sequence of FIG. 15A, 15B, 16A, and 16B.
Figure 17A:
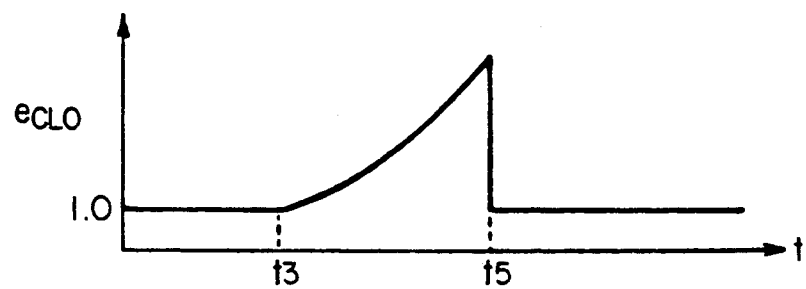
Figure 17A:
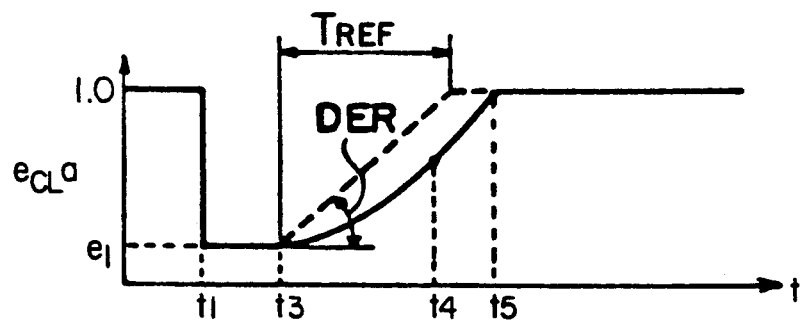
Figure 17A:
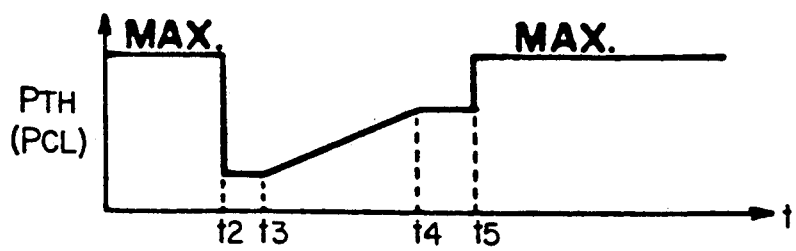
Figure 17B:
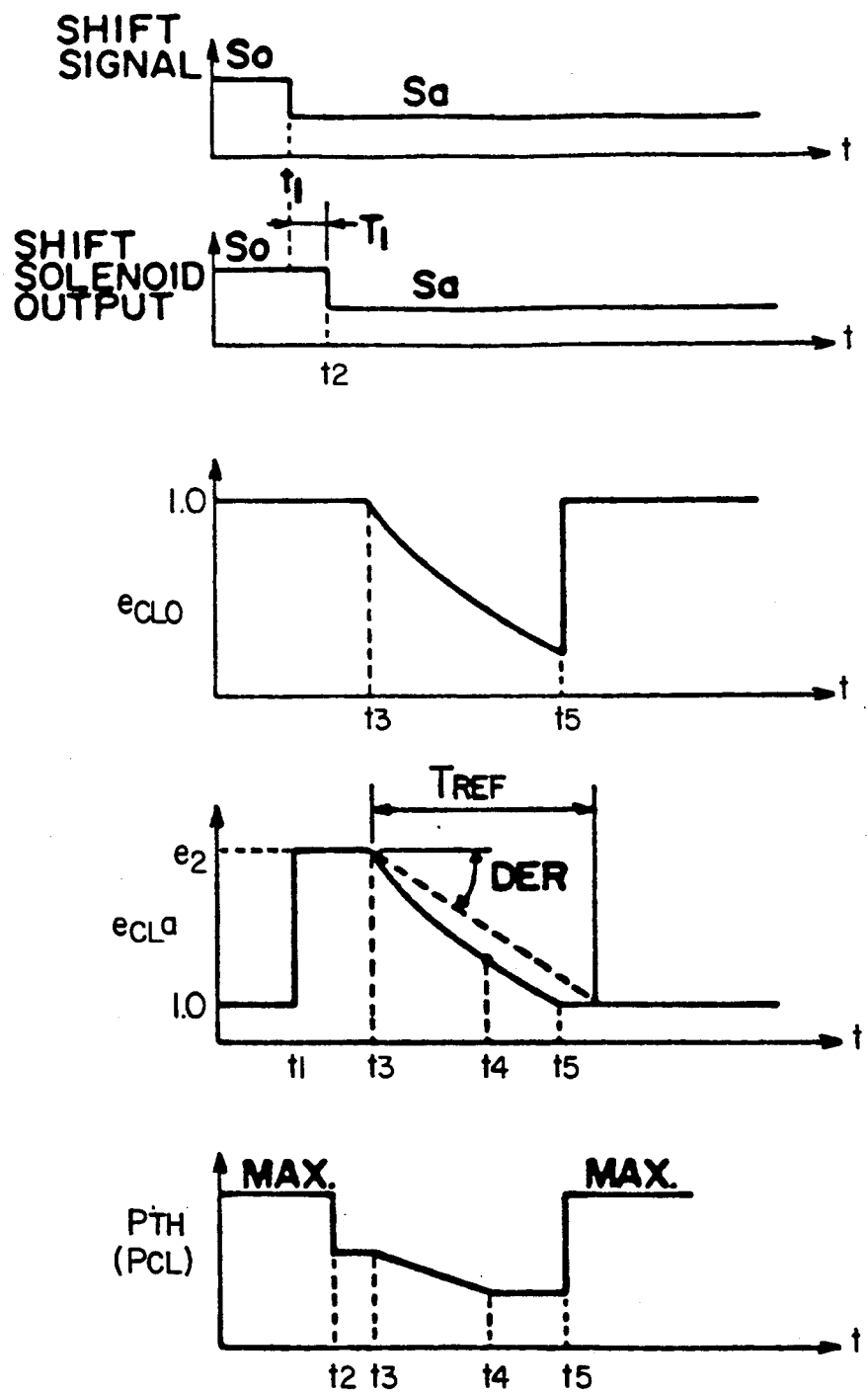

Such a condition is shown in FIGS. 17A and 17B up to a time $t_1$. A gearshift command from the controller 30 and outputs from the shift solenoids 22, 23 ar to keep the present gear position So. Therefore, the present gear position So and the target gear position Sa are the same as each other, and the input and output rotational speed ratio $e_{CLo}(e_{CLa})$ of the gearshift clutch is 1.0. The control pressure $P_{TH}$ is set to a maximum value by the linear solenoid valve 56, and hence the clutch pressure $P_{CL}$ for the hydraulically operated clutch (gearshift means) which selects the present gear position is maximized.

If a gearshift command is then issued at the time $t_1$, a new target gear position Sa is established, resulting in a condition Sa≠So. Control goes from the step S6 to a step S16 which waits for the elapse of a time set by the gearshift decision timer $T_1$ from the time the gearshift command has been issued. Control then goes from the step S16 to a step S18. When the gearshift command is issued for a gearshift, the present gear position So is the previous gear position and the target gear position Sa is the next gear position.

The timer $T_1$ is used to prevent gearshifts from being effected too quickly in the event that different gearshift commands are successively issued in a short period of time. For example, if a gearshift command for a gearshift from the third gear position to the second gear position is issued before the time set by the gearshift decision timer $T_1$ expires after a gearshift command for a gearshift from the fourth gear position to the third gear position has been issued, then a gearshift from the fourth gear position to the second gear position is actually carried out upon elapse of the time set by the gearshift decision timer $T_1$.

As shown in FIGS. 17A and 17B, if a gearshift command for a gearshift from the present gear position So to the target gear position Sa is issued at the time $t_1$, then the shift solenoid output changes from So to Sa at a time $t_2$ upon elapse of the time set by the gearshift decision timer $T_1$. When the gearshift command is issued at the time $t_1$, the target gear position Sa is changed to the gear position according to the gearshift command. Therefore, the input and output rotational speed ratio $e_{CLa}$ of the target-gear-position (next-gear-position) clutch is changed to a value $e_1$ or $e_2$ for the clutch at the target gear position, as shown in FIGS. 17A and 17B.

A step S18 then determines whether a calculation permission flag Fcal is set to 1 or not. If the flag Fcal=0, then control goes to steps S20 through S28 in which prescribed values are established and a reference rate of change for the rotational speed ratio is calculated, after which a flag Fcal is set to 1. If Fcan=1 in the step S18, then control skips the steps S20 through S28 since the prescribed values have been set and the reference rate of change has been calculated.

In the step S20, an initial value $P_{CL}$ (So, Sa) for the clutch pressure $P_{CL}$ which has been set that corresponds to the gearshift (from the present gear position So to the target gear position Sa) at this time is read. In the step S22, a time interval $T_{FBI}$ (So, Sa) between the control cycles of the present control sequence, which has been set that corresponds to the present gearshift, is read. In the step S24, a reference gearshift time $T_{REF}$ (So, Sa), which has been set that corresponds to the present gearshift, is read. Then, the step S26 calculates a reference value DER for the rate of change $\Delta e_{CLa}$ of the input and output rotational speed ratio $e_{CLa}$ of the target-gear-position clutch (next-gear-position clutch), which reference value is required to effect the gearshift within the reference gearshift time $T_{REF}$ (So, Sa), according to the following equation (1):

$$DER = (Go - Ga)/Go/T_{REF} \qquad (1)$$

where
Go: the speed reduction ratio at the present gear position; and
Ga: the speed reduction ratio at the target gear position.

Figure 15B:
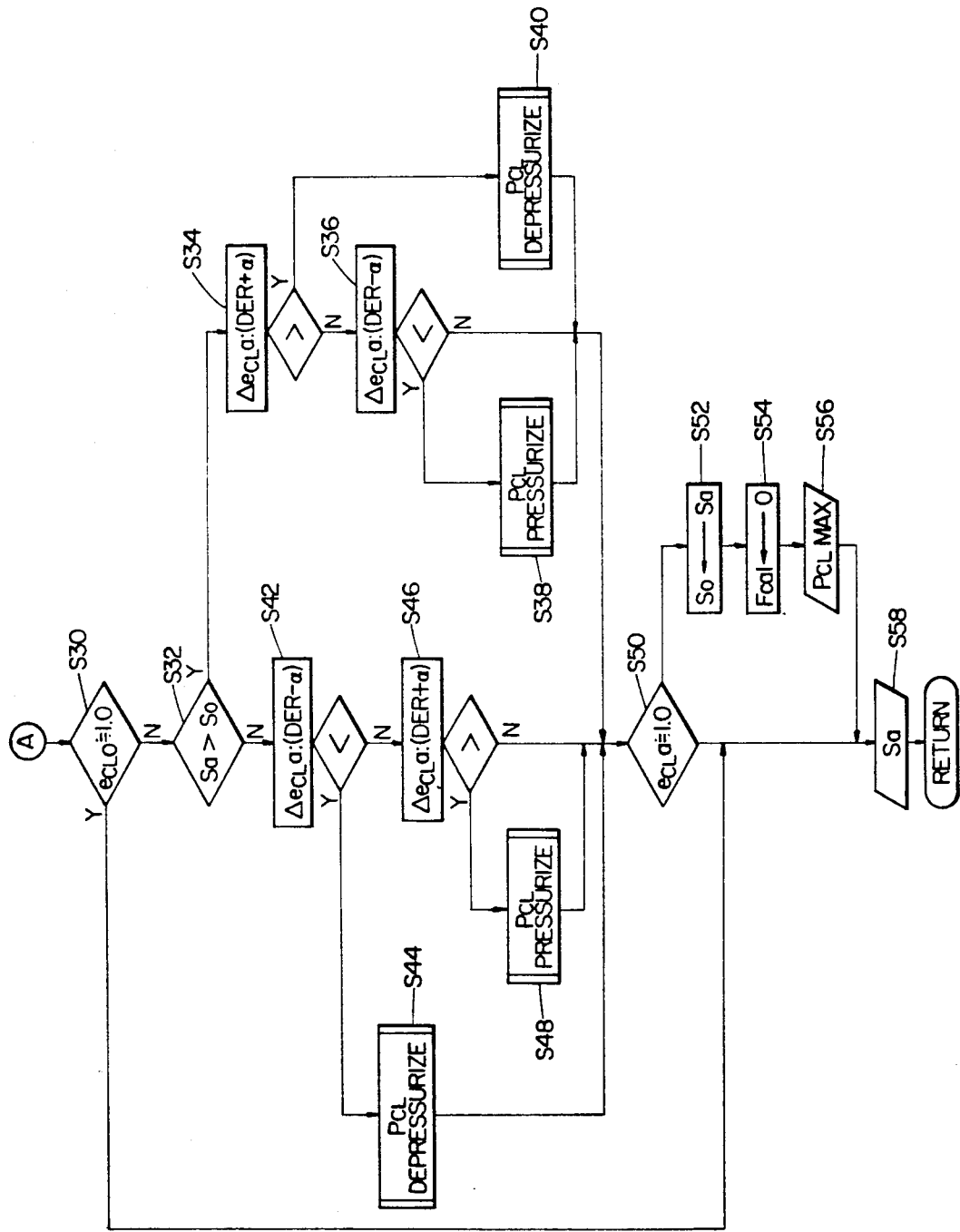

Then, control goes to a step S30 in FIG. 15B which determines whether the input and output rotational speed ratio $e_{CLo}$ of the present-gear-position clutch remains substantially 1.0 or not. Before the present gearshift is effected, the rotational speed ratio $e_{CLo}$ is 1.0. When the gearshift is actually started and the present-gear-position clutch starts being disengaged, then the rotational speed ratio $e_{CLo}$ deviates from 1.0 (specifically, it increases from 1.0 for an upshift and decreases from 1.0 for a downshift). It can thus be determined whether the gearshift has actually been started by determining the value of the input and output rotational speed ratio $e_{CLo}$. The gearshift is actually started after a certain time lag even if the shift solenoid output has changed to Sa. Accordingly, the rotational speed ratio $e_{CLo}$ remains 1.0 during such a time lag. If $e_{CLo} \approx 1.0$, then the gearshift command for the target gear position Sa is kept in a step S58, and the present control cycle is brought to an end.

If $e_{CLo}$ deviates from 1.0 and the gearshift is actually started, then a step S32 determines whether the gearshift commands dictates an upshift or not (i.e., if Sa>So).

Figure 16A:
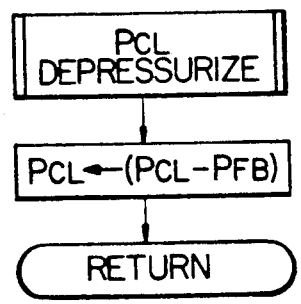

If the gearshift is an upshift, then control goes to a step S34 which compares the rate of change $\Delta e_{CLa}$ of the input and output rotational speed ratio $e_{CLa}$ of the target-gear-position clutch with an upper limit value $(DER + \alpha)$ for the reference rate of change DER. If $\Delta e_{CLa} > (DER + \alpha)$, then the preset clutch pressure $P_{CL}$ is reduced in a step S40 by subtracting a predetermined pressure $P_{FB}$ (which is of a small value) from the preset clutch pressure $P_{CL}$ as shown in FIG. 16A. However, rather than subtracting the constant value from the preset clutch pressure $P_{CL}$, a corrective amount which is proportional to the difference between the rate of change $\Delta e_{CLa}$ and the reference rate of change DER may be subtracted from the preset clutch pressure $P_{CL}$.

Figure 16B:
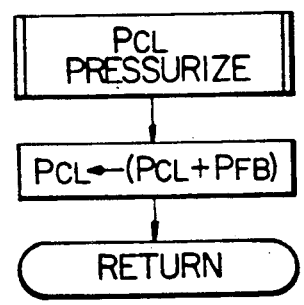

If $\Delta e_{CLa} \leq (DER + \alpha)$, then the rate of change $\Delta e_{CLa}$ is compared with a lower limit $(DER - \alpha)$ for the reference rate of change in a step S36. If $\Delta e_{CLa} < (DER - \alpha)$, then control goes to a step S38 in which the clutch pressure $P_{CL}$ is increased by adding a prescribed pressure $P_{FB}$ to the preset clutch pressure $P_{CL}$ as shown in FIG. 16B.

Correction of the clutch pressure $P_{CL}$ for the upshift will be described below with reference to FIG. 17A. At the time $t_1$, the upshift command for Sa is issued, and at the time $t_2$, the shift solenoid output changes to Sa. Then, after a sight time lag, the present-gear-position clutch starts being disengaged and the target-gear-position clutch starts being engaged at a time $t_3$.

For the upshift, the input and output rotational speed ratio $e_{CLa}$ of the target-gear-position clutch varies from $e_1$ ($<1.0$) to 1.0. The range $(1.0 - e_1)$ over which the ratio $e_{CLa}$ varies is given by:

$$(G_o - G_a)/G_o$$

and is of a positive value. Since the reference gearshift time $T_{REF}$ required for effecting the gearshift with a good driver's feeling has been read in the step S24, the reference rate of change DER of the input and output rotational speed ratio of the target-gear-position clutch for the gearshift is determined by the equation (1) above. The manner in which the ratio $e_{CLa}$ varies based on the reference rate of change DER is indicated by the broken line in FIG. 17A. The ratio $e_{CLa}$ varies from $e_1$ to 1.0 during the reference gearshift time $T_{REF}$ from the time $t_3$. The gradient of the $e_{CLa}$ curve during the reference gearshift time $T_{REF}$ represents the reference rate of change DER.

The rotational speed ratio $e_{CLa}$ actually varies as indicated by the solid line. In this embodiment, the rotational speed ratio $e_{CLa}$ initially varies at a rate smaller than the reference rate of change DER. Thus, it is determined in the step S36 that $\Delta e_{CLa} < (DER - \alpha)$, and the clutch pressure $P_{CL}$ is increased in the step S38. Inasmuch as the clutch pressure $P_{CL}$ is increased in each small interval $T_{FBI}$ set in the step S22, the clutch pressure $P_{CL}$ is progressively increased from the initial value set at the time $t_2$ from the time $t_3$, and so is the rate of change $\Delta e_{CLa}$ of the rotational speed ratio $e_{CLa}$. According to this embodiment, the control pressure $P_{TH}$ is corrected by the linear solenoid valve 56 to correct the clutch pressure $P_{CL}$.

If the rate of change $\Delta e_{CLa}$ of the rotational speed ratio as thus corrected becomes larger than the lower limit $(DER - \alpha)$ for the reference rate of change at a time $t_4$, then the correction is stopped, and the clutch pressure $P_{CL}$ at that time is maintained as it is. The gearshift time for the upshift thus becomes closer to the reference gearshift time $T_{REF}$, and the rate of change $\Delta e_{CLa}$ of the rotational speed ratio becomes closer to the reference rate of change DER. As a result, the upshift is smoothly carried out without a gearshift shock.

The control sequence shown in FIG. 15B includes a step S50 which determining whether the input and output rotational speed ratio $e_{CLa}$ of the target-gear-position clutch has become substantially 1.0, i.e., this clutch is fully engaged to complete the gearshift or not. If $e_{CLa} \approx 1.0$ at a time $t_5$, then control goes to steps S52 through S56 in which the target gear position Sa is set to the present gear position So, the calculation permission flag Fcal is set to 0, and the clutch pressure $P_{CL}$ is maximized. In subsequent cycles, therefore, So=Sa in the step S6, and control goes to the steps S10 through S14.

The above routine is directed to the control process in which the gearshift is an upshift in the step S32. Now, a control process for a downshift will be described below.

If the gearshift is a downshift, then control goes to a step S42 which compares the rate of change $\Delta e_{CLa}$ of the input and output rotational speed ratio $e_{CLa}$ of the target-gear-position clutch with a lower limit value $(DER - \alpha)$ for the reference rate of change DER. If $\Delta e_{CLa} < (DER - \alpha)$, then the preset clutch pressure $P_{CL}$ is reduced in a step S44 by subtracting the predetermined pressure $P_{FB}$ from the preset clutch pressure $P_{CL}$ as shown in FIG. 16A.

If $\Delta e_{CLa} \geq (DER - \alpha)$, then the rate of change $\Delta e_{CLa}$ is compared with the upper limit $(DER + \alpha)$ for the reference rate of change in a step S46. If $\Delta e_{CLa} > (-DER + \alpha)$, then control goes to a step S48 in which the clutch pressure $P_{CL}$ is increased by adding the prescribed pressure $P_{FB}$ to the preset clutch pressure $P_{CL}$ as shown in FIG. 16B.

Correction of the clutch pressure $P_{CL}$ for the downshift will be described below with reference to FIG. 17B. For the downshift, the input and output rotational speed ratio $e_{CLa}$ of the target-gear-position clutch varies from $e_2$ ($>1.0$) to 1.0. The range $(1.0 - e_2)$ over which the ratio $e_{CLa}$ varies is given by:

$$(G_o - G_a)/G_o$$

and is of a negative value. The reference rate of change DER of the input and output rotational speed ratio of the target-gear-position clutch for this gearshift is determined by the equation (1) above. The manner in which the ratio $e_{CLa}$ varies based on the reference rate of change DER is indicated by the broken line in FIG. 17B. The ratio $e_{CLa}$ varies from $e_2$ to 1.0 during the reference gearshift time $T_{REF}$ from the time $t_3$. The gradient of the $e_{CLa}$ curve during the reference gearshift time $T_{REF}$ represents the reference rate of change DER. Since the reference rate of change DER is of a negative value, the gradient is downward to the right.

The rotational speed ratio $e_{CLa}$ actually varies as indicated by the solid line. In this embodiment, the rotational speed ratio $e_{CLa}$ initially varies at a rate smaller (sharper) than the reference rate of change DER. Thus, it is determined in the step S42 that $\Delta e_{CLa} < (DER - \alpha)$, and the clutch pressure $P_{CL}$ is reduced in the step S44. The clutch pressure $P_{CL}$ is progressively decreased from the initial value set at the time $t_2$, from the time $t_3$, and the rate of change $\Delta e_{CLa}$ of the rotational speed ratio $e_{CLa}$ is gradual)y increased (less sharply).

If the rate of change $\Delta e_{CLa}$ of the rotational speed ratio as thus corrected approaches the reference rate of change DER and becomes larger than the lower limit $(DER - \alpha)$ for the reference rate of change at a time $t_4$, then the correction is stopped, and the clutch pressure $P_{CL}$ at that time is maintained as it is. The gearshift time for the downshift thus becomes closer to the reference gearshift time $T_{REF}$, and the rate of change $\Delta e_{CLa}$ of the rotational speed ratio becomes closer to the reference rate of change DER. As a result, the upshift is smoothly carried out without a gearshift shock.

Thereafter, the control process after the step S50 is also effected. This will not be described in detail as it is the same as the process for the upshift.

The gearshift control process for an upshift and a downshift are effected as described above. As shown in FIG. 2, the gearshift modes further include power-on and power-off modes. Therefore, the gearshift control processes for these modes will also be described below.

In the power-on/upshift mode (IPU mode), a reference gearshift time $T_{REF}$ is established based on the full throttle valve opening when the difference between the input and output rotational speeds of the target-gear-position clutch is the greatest in a gearshift. Since the reference gearshift time $T_{REF}$ is selected in order to suppress a gearshift shock upon the full throttle valve opening when the gearshift shock tends to be maximum, gearshifts at other throttle valve openings can be effected with smaller gearshift shocks, and hence no gearshift shock problem is experienced.

In the power-off/upshift mode (SYU mode), the target-gear-position clutch may remain disengaged until the input and output rotational speeds thereof become synchronized, but the gearshift time needed may then be too long. Conversely, if the target-gear-position clutch is engaged too early, then the rotational speed of the clutch may be varied violently, developing noise and gearshift shocks. In this mode, therefore, an appropriate reference gearshift time $T_{REF}$ is established to cause the rotational speed ratio to vary smoothly for smooth gearshifts.

In the power-on/downshift mode (SYD mode), the target-gear-position clutch is engaged when the input and output rotational speeds thereof are synchronized, and until the clutch is engaged, the rotational speed of the clutch should be varied according to an increase in the engine rotational speed. If a downshift from the fourth gear position to the second gear position is to be effected, for example, it takes time for the engine rotational speed to increase, and the gearshift time may be too long. In this case, the gearshift is controlled based on the reference gearshift time $T_{REF}$ thereby to shorten the gearshift time, so that the gearshift may be controlled without making the driver feel uneasy or embarrassed.

In the power-off/downshift mode (IPD and EPD modes), the control process which is the reversal of the control process for the power-on/upshift mode may be carried out. In the IPD mode, since it is a gearshift which expects engine braking, it is preferable to establish a relatively short reference gearshift time $T_{REF}$ for early engine braking. In the EPD mode, it is preferable to establish a relatively long reference gearshift time $T_{REF}$ for effecting a gearshift with a small gearshift shock.

Figure 18:
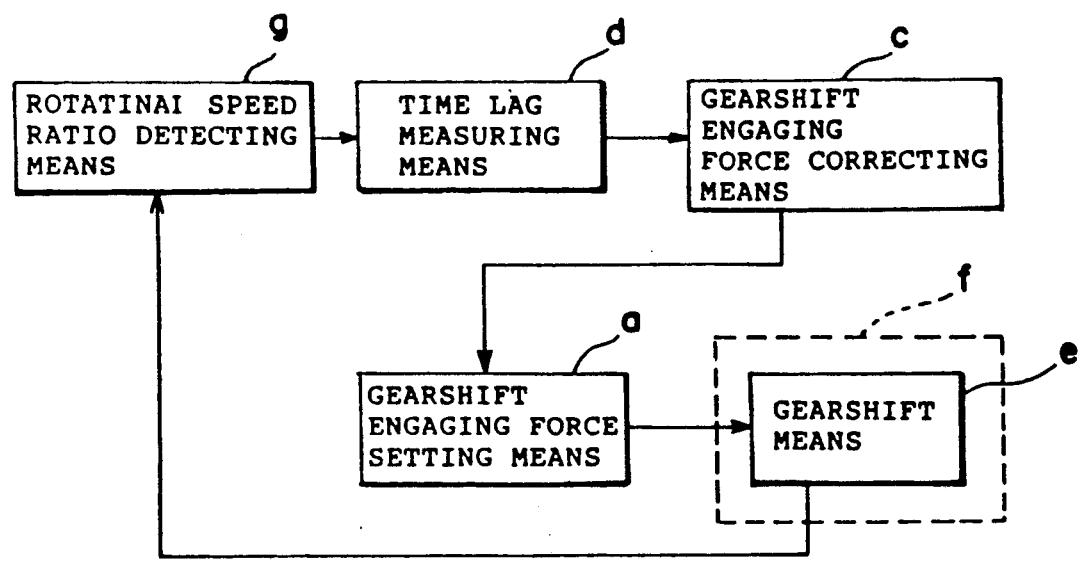
FIG. 18 is a block diagram of a gearshift control apparatus according to still another embodiment of the present invention.

A gearshift control apparatus according to a fourth embodiment of the present invention will be described below. As shown in FIG. 18, the gearshift control apparatus of the third embodiment, which controls a power transmitting means (transmission) f having a plurality of gearshift means e for selecting a power transmission path, includes a gearshift engaging force setting means a for releasing an engaging force of a previous-gear-position gearshift means e and setting an engaging force for a next-gear-position gearshift means e when a gearshift is effected in either the power-off/downshift mode or the power-on/upshift mode, a rotational speed ratio detecting means g for detecting the input and output rotational speed ratio of the gearshift mean e, a time lag measuring means d for measuring, based on a signal from the rotational speed detecting means g, a time lag from the time when an output is issued to effect the gearshift in either one of the modes to the time when the input and output rotational speed ratio of the next-gear-position gearshift means e starts to vary, and a gearshift engaging force correcting means c for comparing the time lag as measured by the time lag measuring means with a reference time lag, and correcting the engaging force for the next-gear-position gearshift means e as set by the gearshift engaging force setting means a from the time when the output for the gearshift in either one of the modes is issued to the time when the input and output rotational speed ratio of the next-gear-position gearshift means e starts to vary, depending on the difference between the time lags, so that the difference between the time lags will be reduced.

When a gearshift is to be effected in either the power-off/downshift mode or the power-on/upshift mode, the engaging force of the previous-gear-position gearshift means e is released and an engaging force for the next-gear-position gearshift means e is set by the gearshift engaging force setting means a, for making a gearshift from the previous gear position to the next gear position. Depending on the time lag from the time when a command for the above gearshift is issued to the time when the input and output rotational speed ratio of the next-gear-position gearshift means e starts to vary (when the next-gear-position gearshift means actually starts to engage), the engaging force in the time lag is corrected by the gearshift engaging force correcting means c. The engaging force is corrected so that the time lag becomes closer to the reference value. For example, if the time lag is larger than the reference value, then the engaging force is set to a larger value to shorten the time lag. Therefore, even when the time lag varies depending on the characteristics of the individual gearshift means and the oil temperature, the time lag is corrected so as to becomes closer to the reference value each time a gearshift is effected, with the result that desired gearshift characteristics can be achieved.

The control process for the power-off/downshift mode will be described in detail with reference to the flow-chart of FIG. 19A and the graph of FIGS. 20A and 20B.

A step S2 seeks or detects a target gear position Sa with respect to a present gear position So from a shift map, and a step S4 determines whether the gear positions So, Sa are equal to each other or not. The gear positions So, Sa are equal to each other if no gearshift command is issued. In this case, control goes to steps S6 through S12 in which a gearshift decision timer $T_1$ is re-started, the torque CTQ transmitted by the present-gear-position clutch is set to a maximum value, the value of a time lag counter TLAG is set to zero, and the present gear position So is maintained as it is.

Then, a current to be supplied to the linear solenoid valve 56, which is required to produce the maximum torque CTQ, is determined in a step S40. The current is then issued in a step S42 to establish a control pressure $P_{TH}$ to obtain the torque CTQ.

Figure 20:
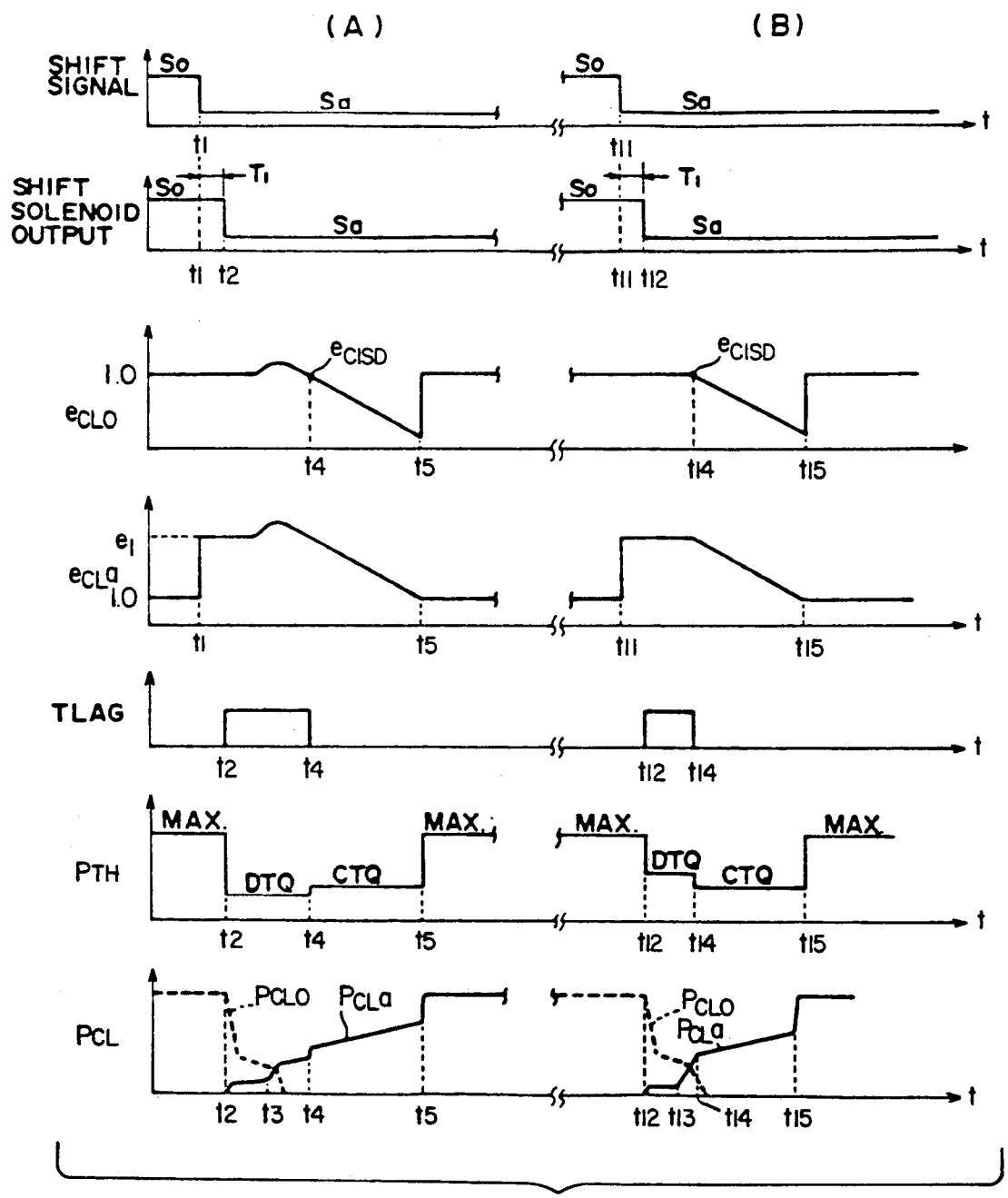

Such a condition is shown in FIG. 20A up to a time $t_1$. A gearshift command from the controller 30 and outputs from the shift solenoids 22, 23 are to keep the present gear position So. Therefore, the present gear position So and the target gear position Sa are the same as each other, and the input and output rotational speed ratio $e_{CLo}$ ($=e_{CLa}$) of the gearshift clutch is 1.0. The control pressure $P_{TH}$ is set to a maximum value by the linear solenoid valve 56, and hence the clutch pressure $P_{CL}$ for the hydraulically operated clutch (gearshift means) which selects the present gear position is maximized. The torque CTQ transmitted by this clutch is maximized.

If a gearshift command is then issued, a new target gear position Sa is established, resulting in a condition Sa≠So. When the gearshift command is detected, control proceeds to a step S14 which waits for the elapse of a time set by the gearshift decision timer $T_1$ from the time the gearshift command has been issued. Control then goes from the step S14 to a step S16. The gearshift decision timer $T_1$ is used to prevent gearshifts from being effected too quickly in the event that different gearshift commands are successively issued in a short period of time. For example, if a gearshift command for a gearshift from the third gear position to the second gear position is issued before the time set by the gearshift decision timer $T_1$ expires after a gearshift command for a gearshift from the fourth gear position to the third gear position has been issued, then a gearshift from the fourth gear position to the second gear position is actually carried out upon elapse of the time set by the gearshift decision timer $T_1$.

The step S16 determines whether Sa>So, i.e., an upshift is to be effected or not. If an upshift is to be effected, then control does to the flowchart shown in FIG. 19B. The flowchart of FIG. 19B will be described later on. If Sa<So and hence a downshift is to be effected, control goes to a step S18 which determines whether the mode is the power-on mode or not. If the power-on mode, then control goes to a step S20 in which the power-on/downshift mode is processed. Since the power-off/downshift mode is to be processed here, the control process in the step S20 will not be described. When a gearshift command is issued to effect a gearshift, the present gear position So is the previous gear position, and the target gear position Sa is the next gear position.

If the power off/downshift mode is to be processed, control goes to a step S22 in which the shift solenoid is operated to effect a gear shift from So to Sa. As shown in FIG. 20A, if a gearshift command for a gearshift from the present gear position So to the target gear position Sa is issued at the time $t_1$, then the shift solenoid output changes from So to Sa at a time $t_2$, upon elapse of the time set by the gearshift decision timer $T_1$ at the step S14. When the gearshift command is issued at the time $t_1$, the target gear position Sa is changed to the gear position according to the gearshift command. Therefore, the input and output rotational speed ratio $e_{CLa}$ of the target-gear-position (next-gear-position) clutch is changed to a value $e_1$ for the clutch at the target gear position.

At this time, a step S24 determines whether the input and output rotational speed ratio $e_{CLo}$ of the present-gear-position clutch is smaller than a gearshift start decision value $e_{CISD}$ or not. Even if the shift solenoid output changes to Sa, the present-gear-position clutch is not immediately disengaged, but there is a certain time lag before it is actually disengaged. Therefore, the condition $e_{CLo} \geq e_{CISD}$ remains initially. In this case, the time lag starts being measured by the time lag counter TLAG at a step S26. In a step S28, a rising clutch torque DTQ is set to a rising clutch torque DTQ (Sa, So) which is stored according to a gearshift pattern.

When the shift solenoid output changes to Sa at the time $t_2$, the shift valve is operated to interrupt the supply of the hydraulic pressure to the hydraulically operated clutch for the preset gear position (previous gear position). The clutch pressure $P_{CLo}$ sharply drops to a preset pressure of the accumulator corresponding to this clutch. At the same time, the hydraulic pressure or clutch oil pressure starts being supplied to the hydraulically operated clutch for the target gear position at the time $t_2$. The hydraulic pressure supplied at this time is the hydraulic pressure $P_{CL}$ (DTQ) corresponding to the rising clutch torque DTQ. The current is determined and issued in the steps S40, S42 to produce such hydraulic pressure. The control pressure $P_{TH}$ is set to the corresponding hydraulic pressure $P_{TH}$ (DTQ) by the linear solenoid valve 56.

The clutch pressure $P_{CL}$ is of a low value corresponding to the resistance presented by the pipe coupled to the hydraulic chamber of the target-gear-position clutch up to a time $t_3$ until the pipe is filled with the clutch oil and the clutch is completely moved an ineffective stroke of the piston of the clutch. This time interval (from $t_2$ to $t_3$) is referred to as a "filling time". As shown in FIG. 20A, the clutch pressure $P_{CL}$ is very low during the filling time. After the filling time, the clutch pressure $P_{CL}$ rises to a pressure $P_{CL}$ (DTQ) corresponding to the control pressure $P_{TH}$ (DTQ). As the clutch pressure increases, the orifice control valve is operated to discharge the hydraulic pressure from the present-gear-position clutch to drain until the hydraulic pressure $P_{CLo}$ for this clutch is reduced to zero whereupon the present-gear-position clutch is fully disengaged.

At the same time, the target-gear-position clutch starts being engaged to start the gearshift actually. When the gearshift is actually started, the input and output rotational speed ratio $e_{CLa}$ of the target-gear-position clutch decreases from $e_1$ to 1.0, and the input and output rotational speed ratio $e_{CLo}$ of the present-gear-position clutch is reduced from 1.0. Therefore, if $e_{CLo} < e_{CISD}$ at a time $t_4$ in the step S24, then the time lag TLAG from the time $t_2$ when the shift solenoid output changes to the target gear position Sa to the time $t_4$ when $e_{CLo} < e_{CISD}$ is read from the value measured by the time lag counter, and then control goes to a step S30.

FIG. 20A shows that the rising torque DTQ thus set is small, and the control pressure $P_{TH}$ and the clutch pressure $P_{CL}$ are low, with the filling time being long. Since the clutch pressure $P_{CL}$ is low, the present-gear-position clutch slips before the target-gear-position clutch starts being engaged, with the result that the input and output rotational speed ratio $e_{CLo}$ of the present-gear-position clutch becomes larger than 1.0. Therefore, the input and output rotational speed ratio $e_{CLa}$ of the target-gear-position clutch is also larger than 1.0. In this case, even if the target-gear-position clutch starts being engaged, it takes time for the input and output rotational speed ratio $e_{CLo}$ of the present-gear-position clutch to become smaller than the gearshift start decision value $e_{CISD}$, and the time lag TLAG becomes longer. When this happens, the driver may feel embarrassed because deceleration of the vehicle is delayed even if the accelerator pedal is released and engine rotational speed temporarily drops.

The step S30 determines the difference Ao (=TLAG-DLAGD) between the time lag TLAG at this time and a predetermined reference time lag DLAGD. Then, the value of the rising torque DTQ is corrected according to the following equation (2) using the difference Ao in a step S32:

$$DTQ\,(Sa,\,So) = DTQ\,(Sa,\,So) + Ao \times TLAG \quad (2)$$

Through this correction, the rising torque DTQ is increased if the rising torque DTQ is small and the time lag TLAG is longer than the reference value DLAGD, and reduced otherwise. The rising torque DTQ thus corrected is stored as a new rising torque.

In a next power-off/downshift mode, as shown in FIG. 20B, therefore, when a gearshift command is issued at a time $t_{11}$ and, after elapse of the time set by the gearshift decision timer $T_1$, the shift solenoid output changes to Sa at a time $t_{11}$, the clutch pressure $P_{CL}$ is established such that the torque for the target-gear-position clutch will become the corrected rising torque DTQ from the time $t_{12}$. Thus, the filling time (the time up to a time $t_{13}$) is shortened, and so is the time lag TLAG until the condition $e_{CLo} < e_{CISD}$ is reached, i.e., the gearshift is actually started, the time lag TLAG approaching the reference time lag DTAGD. In subsequent gearshifts, the driver does not feel embarrassed as the deceleration is not delayed when the accelerator pedal is released and the engine rotational speed does not temporarily drop.

After the torque correction in the step S32, a torque CTQ required to engage the target-gear-position clutch is calculated, and a current for the linear solenoid valve 56 is determined and issued in order to produce the calculated torque CTQ in the steps S40, S42. The control pressure $P_{TH}$ is set to a hydraulic pressure $P_{TH}$ (CTQ) corresponding to the torque CTQ from the time $t_4$ (time $t_{14}$ in FIG. 20B) for a gearshift.

When the input and output rotational speed ratio $e_{CLo}$ of the target-gear-position clutch becomes substantially 1.0, it is determined the gearshift is completed, and the gear position Sa is set as the present gear position So. In the next cycle, therefore, Sa = So in the step S4, and the torque CTQ is maximized in the step S8.

Figure 5:
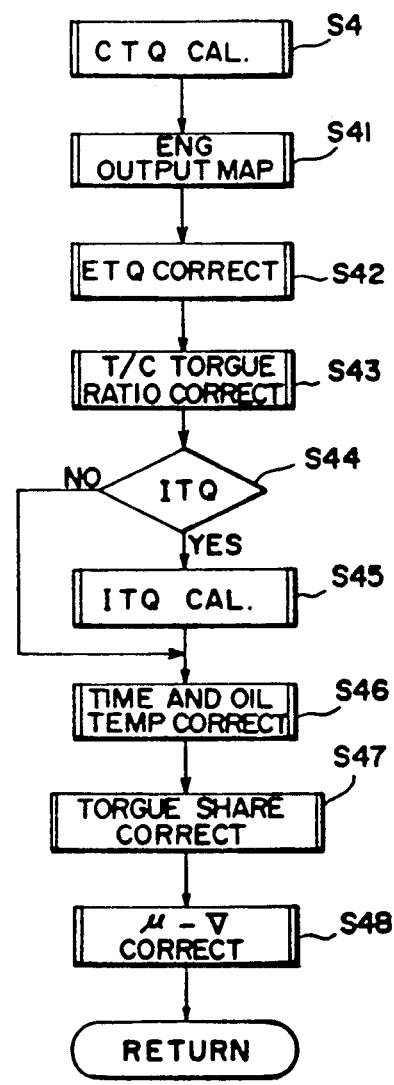

The torque CTQ in the step S34 is calculated in the same routine as the routine of FIG. 5.

In the above description, the rising torque DTQ is corrected when it is small and the time lag is long (FIG. 20A). Correction of the rising torque DTQ when it is too large will be described below with reference to FIG. 21.

Figure 21:
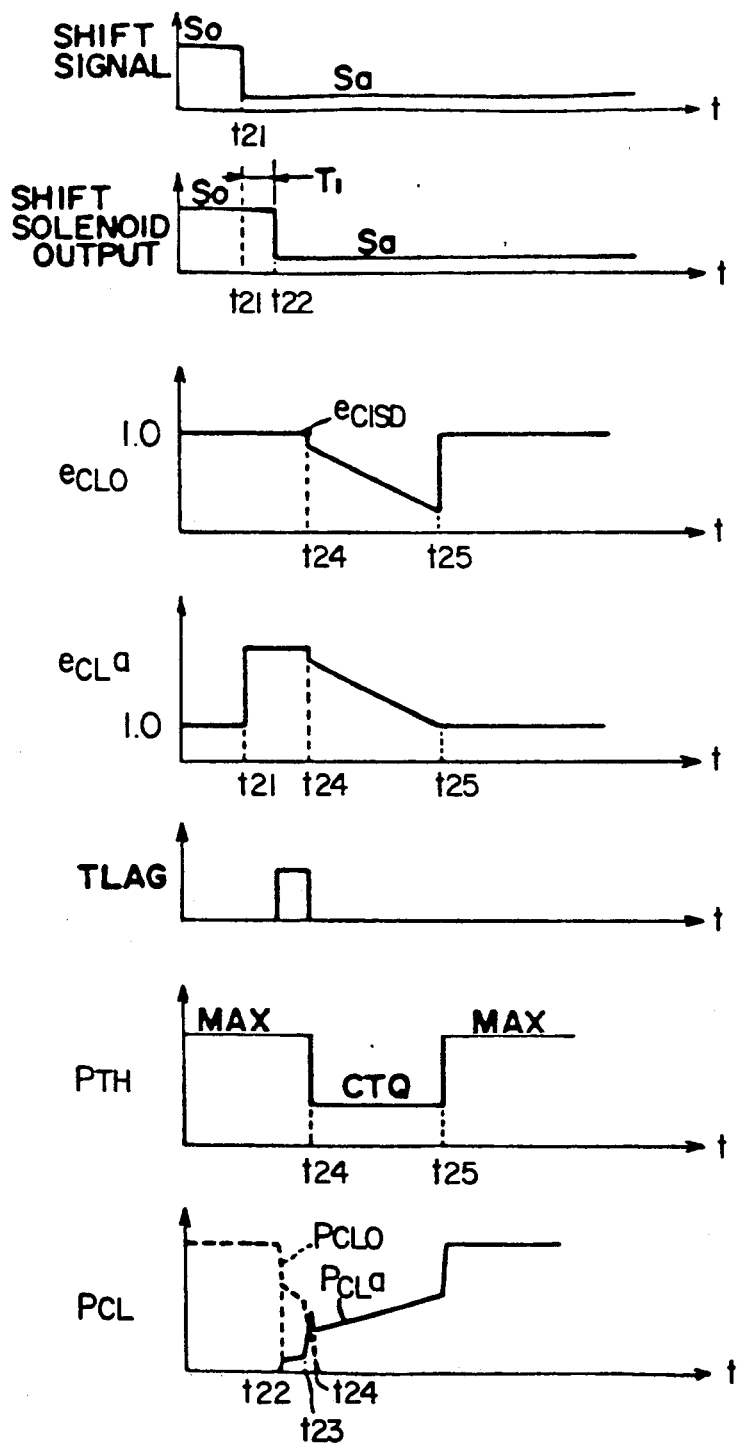

In FIG. 21, a maximum torque is set as the rising torque DTQ. A gearshift command is issued at a time $t_{21}$, and the shift solenoid output changes from So to Sa at a time $t_{22}$ after elapse of the time set by the gearshift decision timer $T_1$. From the time $t_{22}$, the hydraulic pressure supplied to the target-gear-position clutch becomes a hydraulic pressure corresponding to the rising torque DTQ. Since the torque DTQ is of the maximum level, the supplied hydraulic pressure (clutch pressure) $P_{CL}$ is also maximized, and the filling time is considerably shortened as shown.

Upon elapse of the filling time at a time $t_{23}$, the pressure $P_{CLo}$ for the present-gear-position clutch is reduced to zero, and the clutch pressure $P_{CLa}$ for the target-gear-position clutch starts to rise quickly up to a value corresponding to the torque DTQ, i.e., the maximum hydraulic pressure. The target-gear-position clutch now starts being engaged. Inasmuch as the clutch pressure $P_{CLa}$ increases quickly, the target-gear-position clutch is engaged quickly, and the input and output rotational speed ratio $e_{CLa}$ thereof varies quickly, producing a gearshift shock.

If the rotational speed ratio $e_{CLa}$ varies quickly, the rotational speed ratio $e_{CLo}$ also varies quickly. The condition $e_{CLo} < e_{CISD}$ is reached soon at a time $t_{24}$, and the torque of the target-gear-position clutch changes to the torque CTQ calculated in the step S34. Consequently, the clutch pressure $P_{CLa}$ has its peak value at the time $t_{24}$, and thereafter drops to a pressure $P_{CLa}$ (CTQ) corresponding to the torque CTQ.

In this case, the filling time is short and the time lag TLAG is also short, and the time lag difference Ao calculated in the step S30 is negative. In the step S32, therefore, the rising torque DTQ is corrected so as to be smaller based on the difference Ao. In a next gearshift, as the corrected torque DTQ is used as the rising torque DTQ, the filling time becomes longer, and the time lag TLAG becomes closer to the reference value, reducing a gearshift shock.

Figure 22:
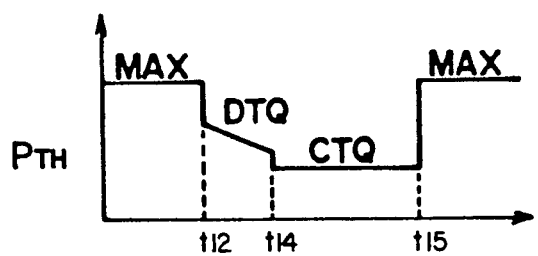
FIGS. 20, 21 and 22 are graphs showing how various control values vary with respect to time in the control sequence shown in FIGS. 19A and 19B.

The rising torque DTQ is set as a constant value for each gearshift. However, the rising torque DTQ may be of such variable characteristics that it approaches the subsequent rising torque DTQ, from the time ($t_{12}$ in FIG. 20B) when the shift solenoid output changes to the time (time $t_{14}$ in FIG. 20B) when the clutch begins to be engaged. In such a case, as shown in FIG. 22, the control pressure $P_{TH}$ is gradually lowered from the time $t_{12}$ to the time $t_{14}$ so as to become closer to the pressure $P_{TH}$ (CTQ) after the time $t_{14}$.

Now, the power-on/upshift mode will briefly be described with reference to FIG. 19B.

Figure 19A:
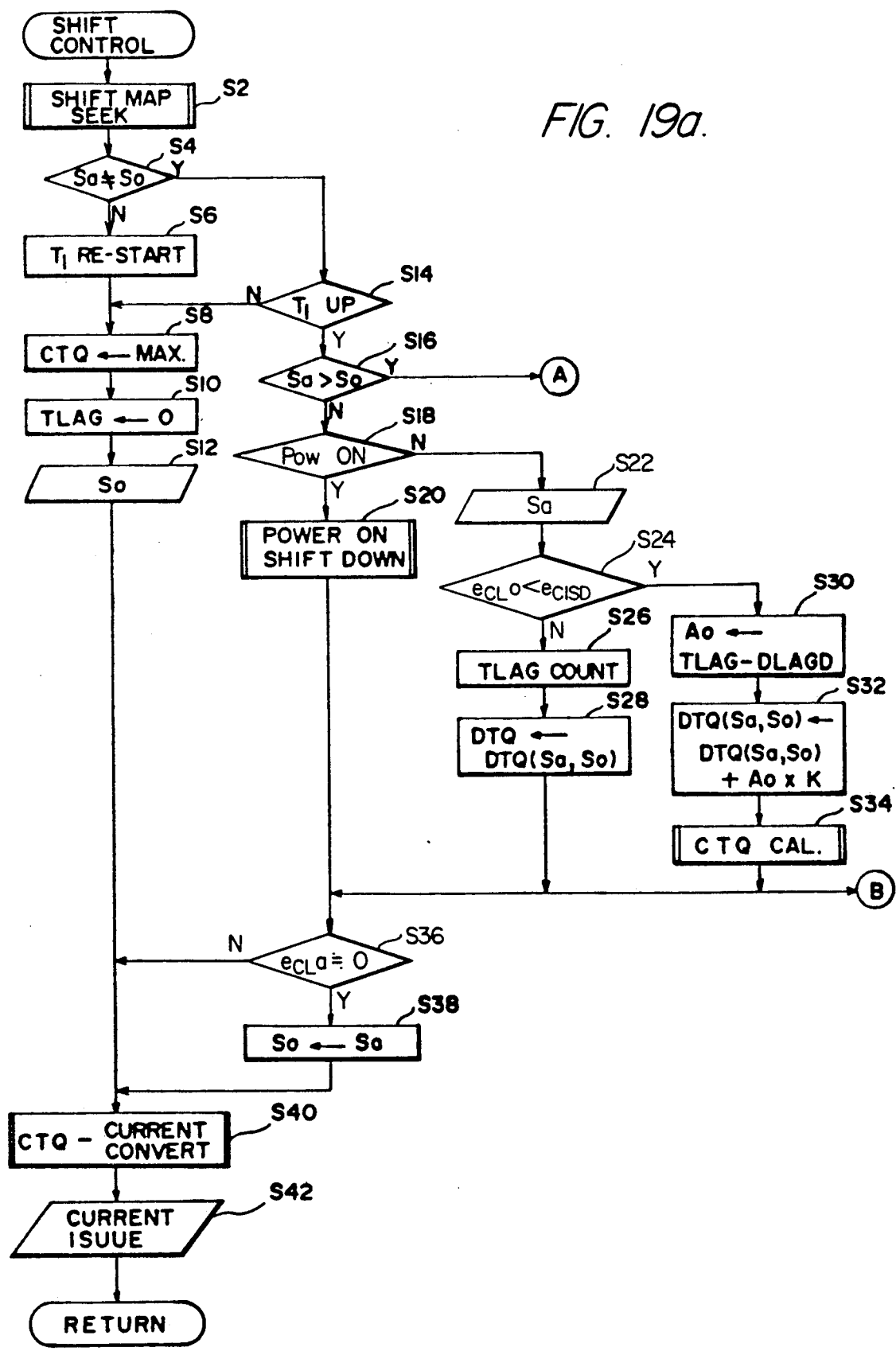
FIGS. 19A and 19B are flowcharts of a control sequence of the gearshift control apparatus shown in FIG. 18.
Figure 19B:
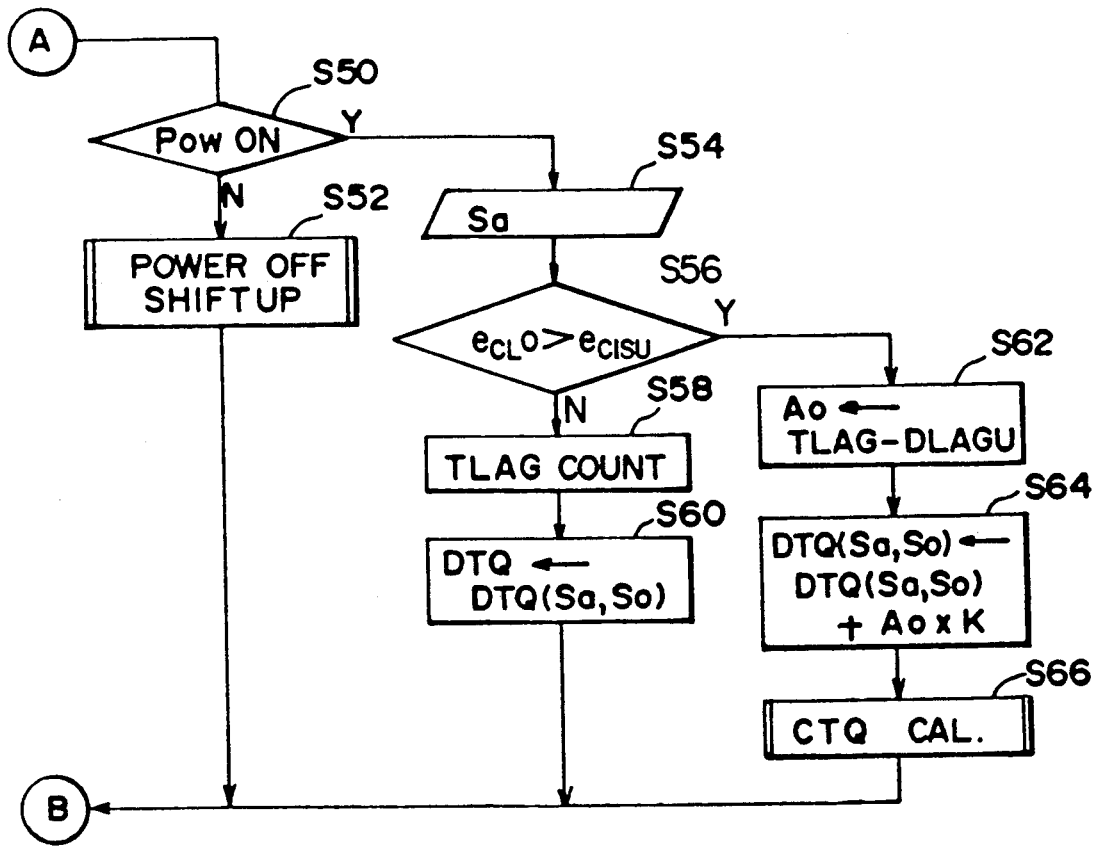

The routine shown in FIG. 19B is branched from the step S16 of FIG. 19A. A step S50 determines whether the mode is the power-on mode or not. If it is the power-off mode, control goes to a step S52 in which the power-on/upshift mode is processed. The power-on/upshift mode will not be described in detail as it has no direct bearing on the routine of FIG. 19B.

If the power-on/upshift mode is to be processed, control goes to a step S54 in which the shift solenoid output changes to the target gear position Sa, and then a step S56 determines whether the input and output rotational speed ratio $e_{CLo}$ of the present-gear-position clutch is smaller than a gearshift start decision value $e_{CISU}$ or not. If the gearshift is an upshift, the input and output rotational speed ratio $e_{CLo}$ of the target-gear-position clutch increases from 1.0. Therefore, the step S56 determines whether the clutch actually starts being engaged or not.

As long as the condition $e_{CLo} \leq e_{CISU}$ remains, the time lag TLAG is measured by the time lag counter TLAG in a step S58, and a stored rising torque DTQ is set in a step S60.

If the condition $e_{CLo} > e_{CISU}$ is reached, then the difference Ao (= TLAG − DLAGD) between the time lag TLAG from the shift solenoid output for Sa to the present time and the reference time lag DLAGD is determined in a step S62, and the rising torque DTQ is corrected depending on the difference Ao according to the above equation (2) in a step S64. The rising torque thus corrected becomes closer to the reference time lag. Through this correction, the engine is prevented from racing due to the time lag being too long, or gearshift shocks are prevented from being produced due to the time lag being too short.

Thereafter, the torque CTQ for engaging the target-gear-position clutch is calculated in a step S66, and a control pressure $P_{TH}$ is established to produce the calculated torque CTQ.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A gearshift control apparatus for an automatic transmission having power transmitting means providing a plurality of power transmission paths, and a plurality of gearshift means engageable and disengageable to select one of said power transmission paths at a time, said gearshift control apparatus comprising:

engaging force setting means for setting engaging forces for the gearshift means when a gearshift is to be effected wherein said gearshift means comprise hydraulically operated clutches and said engaging force setting means comprises hydraulic pressure setting means for setting hydraulic pressures to operate said hydraulically operated clutches by calculating an engaging torque required by each of the hydraulically operated clutches to provide the desired gearshift characteristics, calculating a hydraulic pressure required to produce said engaging torque when the hydraulically operated clutch is at rest, and subtracting, from said calculated hydraulic pressure, a hydraulic pressure corresponding to a centrifugal hydraulic pressure developed in said hydraulically operated clutch when it is rotated during the gearshift; and engaging force correcting means for correcting said engaging forces to provide desired gearshift characteristics.

2. A gearshift control apparatus according to claim 1, wherein said hydraulic pressure setting means comprises a linear solenoid for controlling said hydraulic pressure in response to an electric current supplied thereto.

3. A gearshift control apparatus according to claim 1, wherein said engaging torque (CTQ) required by said hydraulically operated clutch is calculated based on a torque which is derived from an engine torque (ETQ) and shared by said hydraulically operated clutch.

4. A gearshift control apparatus according to claim 1, wherein said engaging torque (CTQ) required by said hydraulically operated clutch is calculated based on a torque which is derived from the sum of an engine torque (ETQ) and an inertia torque (ITQ) and shared by said hydraulically operated clutch.

5. A gearshift control apparatus according to claim 1, wherein there are established a maximum value ($CTQ_{MAX}$) and a minimum value ($CTQ_{MIN}$) for said engaging torque (CTQ), and if the calculated torque is larger than said maximum value ($CTQ_{MAX}$), then said maximum value ($CTQ_{MAX}$) is set as the engaging torque (CTQ), and if the calculated torque is smaller than said minimum value ($CTQ_{MIN}$), then said minimum value ($CTQ_{MIN}$) is set as the engaging torque (CTQ).

6. A gearshift control apparatus for an automatic transmission having power transmitting means providing a plurality of power transmission paths, and a plurality of gearshift means engageable and disengageable to select one of said power transmission paths at a time, said gearshift control apparatus comprising:

engaging force setting means for setting engaging forces for the gearshift means when a gearshift is to be effected wherein said gearshift means comprise frictionally engageable gearshift means, and said engaging force setting means comprises pressing force setting means for setting forces to press friction members of said frictionally engageable gearshift means;

engaging force correcting means for correcting said engaging forces to provide desired gearshift characteristics; and immediately prior condition detecting means for detecting a condition immediately before input and output rotatable members of the frictionally engageable gearshift means are directly coupled through frictional engagement based on the rotation of the input and output rotatable members, said engaging force correcting means including means for lowering the force to press the friction members of the frictionally engageable gearshift means, which force has been set by said pressing force setting means, until a prescribed period of time elapses from the time when the condition immediately before the input and output members of the frictionally engageable gearshift means are directly coupled is detected by the immediately prior condition detecting means.

7. A gearshift control apparatus according to claim 6, wherein said condition is detected by detecting when the ratio between the rotational speeds of said input and output rotatable members of said frictionally engageable gearshift means reaches a threshold value close to 1.0.

8. A gearshift control apparatus according to claim 6, wherein said force to press the friction members is lowered using the ratio of a normal dynamic coefficient ($\mu k$) of friction to a final dynamic coefficient ($\mu o$) of friction.

9. A gearshift control apparatus for an automatic transmission having power transmitting means providing a plurality of power transmission paths, and a plurality of gearshift means engageable and disengageable to select one of said power transmission paths at a time, said gearshift control apparatus comprising:

engaging force setting means for setting engaging forces for the gearshift means when a gearshift is to be effected;

engaging force correcting means for correcting said engaging forces to provide desired gearshift characteristics;

rotational speed ratio detecting means for detecting the input and output rotational speed ratio of said gearshift means; and rate-of-change comparing means for determining the rate of change of the input and output rotational speed ratio of said gearshift means as detected by the rotational speed ratio detecting means and comparing the determined rate of change with a reference rate of change to determine the difference therebetween, said gearshift engaging force correcting means including means for correcting the engaging force of said gearshift means as set by said engaging force setting means, depending on said determined difference between the rates of change, so that the rate of change of the input and output rotational speed ratio of said gearshift means becomes closer to the reference rate of change.

10. A gearshift control apparatus according to claim 9 further comprising a means for determining whether a gearshift is an upshift or a downshift, wherein, in an upshift, if said determined rate of change is larger than said reference rate of change, then said engaging force is reduced by said engaging force correcting means, and if said determined rate of change is smaller than said reference rate of change, said engaging force is increased by said engaging force correcting means.

11. A gearshift control apparatus according to claim 9 further comprising a means for determining whether a gearshift is an upshift or a downshift, wherein, in a downshift, if said determined rate of change is larger than said reference rate of change, then said engaging force is increased by said engaging force correcting means, and if said determined rate of change is smaller than said reference rate of change, said engaging force is reduced by said engaging force correcting means.

12. A gearshift control apparatus for an automatic transmission having power transmitting means providing a plurality of power transmission paths, and a plurality of gearshift means engageable and disengageable to select one of said power transmission paths at a time, said gearshift control apparatus comprising:
   engaging force setting means for setting engaging forces for the gearshift means when a gearshift is to be effected;
   engaging force correcting means for correcting said engaging forces to provide desired gearshift characteristics;
   rotational speed ratio detecting means for detecting the input and output rotational speed ratio of said gearshift means; and
   rate-of-change comparing means for determining the rate of change of the input and output rotational speed ratio of said gearshift means as detected by the rotational speed ratio detecting means and comparing the determined rate of change with a reference rate of change (DER) to determine the difference therebetween, said gearshift engaging force correcting means including means for correcting the engaging force for said gearshift means as set by said engaging force setting means, depending on said determined difference between the rates of change, so that the rate of change of the input and output rotational speed ratio of said gearshift means becomes closer to the reference rate of change (DER) wherein said reference rate of change (DER) is calculated according to the following equation:

$$DER = (Go = Ga)/Go/T_{REF}$$

where
   $Go$: the speed reduction ratio of a previous-gear-position gearshift means;
   $Ga$: the speed reduction ratio of a next-gear-position gearshift means; and
   $T_{REF}$: a reference gearshift time.

13. A gearshift control apparatus for an automatic transmission having power transmitting means providing a plurality of power transmission paths, and a plurality of gearshift means engageable and disengageable to select one of said power transmission paths at a time, said gearshift control apparatus comprising:
   engaging force setting means for setting engaging forces for the gearshift means when a gearshift is to be effected;
   engaging force correcting means for correcting said engaging forces to provide desired gearshift characteristics;
   rotational speed ratio detecting means for detecting the input and output rotational speed ratio of said gearshift means; and
   time lag measuring means for measuring, based on a signal from the rotational speed detecting means, only a time lag from the time when an output is issued to effect a gearshift in either one of power-off/downshift and power-on/upshift modes to the time when the input and output rotational speed ratio of said gearshift means starts to vary, wherein said engaging force correcting means compares only the time lag as measured by said time lag measuring means with a reference time lag, and corrects the engaging force for said gearshift means as set by said engaging force setting means only from the time when the output for the gearshift in said one mode is issued to the time when the input and output rotational speed ratio of said gearshift means starts to vary, depending on the difference between the time lags, so that the difference between the time lags will be reduced.

14. A gearshift control apparatus according to claim 13, wherein said engaging force correcting means comprises means for varying the engaging force in a current gearshift based on the correction in the engaging force determined in a preceding gearshift by said engaging force correcting means.

15. A gearshift control apparatus according to claim 13, wherein if said measured time lag is longer than said reference time lag, then said engaging force is increased by said engaging force correcting means, and if said measured time lag is shorter than said reference time lag, then said engaging force is reduced by said engaging force correcting means.

* * * * *